US012562514B2

(12) United States Patent
Hettler et al.

(10) Patent No.: US 12,562,514 B2
(45) Date of Patent: Feb. 24, 2026

(54) ELECTRICAL FEEDTHROUGH

(71) Applicant: Schott AG, Mainz (DE)

(72) Inventors: Robert Hettler, Kumhausen (DE); Yvonne Schoen, Landshut (DE); Doris Kellerer, Pfeffenhausen (DE); Wee Kiat Chai, Singapore (SG)

(73) Assignee: Schott AG, Mainz (DE)

( * ) Notice: Subject to any disclaimer, the term of this patent is extended or adjusted under 35 U.S.C. 154(b) by 855 days.

(21) Appl. No.: 17/834,705

(22) Filed: Jun. 7, 2022

(65) Prior Publication Data

US 2022/0393373 A1 Dec. 8, 2022

(30) Foreign Application Priority Data

Jun. 8, 2021 (DE) ..................... 20 2021 103 079.8
Jun. 8, 2021 (EP) .................................... 21178141

(51) Int. Cl.
*H01R 9/22* (2006.01)
*H01B 17/30* (2006.01)
*H01R 13/52* (2006.01)
*H01R 13/533* (2006.01)

(52) U.S. Cl.
CPC ............... *H01R 9/22* (2013.01); *H01B 17/30* (2013.01); *H01B 17/305* (2013.01); *H01R 13/521* (2013.01); *H01R 13/533* (2013.01)

(58) Field of Classification Search
CPC ........ H01R 9/22; H01R 13/22; H01R 13/521; H01R 13/533; H01R 13/02; H01R 13/40; H01R 13/502; H01B 17/30; H01B 17/305; H02G 3/22
See application file for complete search history.

(56) References Cited

U.S. PATENT DOCUMENTS 2,890,433 A * 6/1959 Liljenberg ............. H01R 13/22 439/289
4,401,734 A * 8/1983 Meyer ................. H01M 50/172 429/185
4,445,741 A * 5/1984 Annoot ................ H01R 25/003 439/456
4,483,065 A * 11/1984 Meyer ................. H01M 50/172 29/623.2

(Continued)

FOREIGN PATENT DOCUMENTS

DE 32 14 487 A1 10/1983
GB 1 562 092 3/1980
GB 1562092 A * 3/1980 ........... H01B 17/305

*Primary Examiner* — Briggitte R. Hammond
(74) *Attorney, Agent, or Firm* — TAYLOR & EDELSTEIN, PC

(57) ABSTRACT

An electrical feedthrough includes a base body having a first side and an opposed second side and at least one through-hole extending through the base body from the first side to the second side, an insulating material received in the through-hole, the insulating material having a first surface on the first side of the base body and an opposed second surface on the second side of the base body, and an electrical conductor extending through the insulating material, the electrical conductor having a first diameter at the location of the first surface of the insulating material and a second diameter at the location of the second surface of the insulating material, wherein the first diameter of the electrical conductor is larger than the second diameter of the electrical conductor.

15 Claims, 18 Drawing Sheets

(56) References Cited

U.S. PATENT DOCUMENTS

| | | | | |
|---|---|---|---|---|
| 5,525,759 | A * | 6/1996 | Salzman | H01B 17/26<br>174/50.56 |
| 7,561,917 | B2 * | 7/2009 | Wegrzyn, III | A61N 1/3754<br>607/36 |
| 8,127,681 | B2 | 3/2012 | Fink | |
| 9,937,354 | B2 * | 4/2018 | Barry | H05K 1/0213 |
| 10,272,253 | B2 * | 4/2019 | Seitz | H01B 17/303 |
| 2003/0139096 | A1 * | 7/2003 | Stevenson | H01R 24/28<br>333/182 |
| 2007/0184678 | A1 | 8/2007 | Codling et al. | |
| 2015/0245468 | A1 * | 8/2015 | Barry | H05K 3/32<br>174/257 |

* cited by examiner

ELECTRICAL FEEDTHROUGH

CROSS REFERENCE TO RELATED APPLICATIONS

This application claims priority to both (1) European patent application no. EP 21 178 141.4, filed Jun. 8, 2021, which is incorporated herein by reference, and (2) German patent application no. DE 20 2021 103 079.8, filed Jun. 8, 2021, which is incorporated herein by reference.

BACKGROUND OF THE INVENTION

1. Field of the Invention

The present invention relates to an electrical feedthrough including an outer base body with at least one through-hole, an insulating material received in the through-hole, and an inner electrical conductor extending through the insulating material.

2. Description of the Related Art

Electrical feedthroughs can be used to guide electrical conductors into hermetically sealed environments or housings. To this end, a sealing connection between the outer base body, the insulating material, and the insulated inner electrical conductors is provided. Such feedthroughs can be designed, for example, as glass-to-metal seals (GTMS), in which case the insulating material is made from glass, and the base body and electrical conductors are made from metal.

Electrical feedthroughs, in particular GTMS, cover a wide range of applications, for example in electronics and electrical engineering. Some examples of applications are connectors, charging ports, e.g. for wearables, consumer electronics devices, platform applications, medical devices, e.g. pace makers, but also components for harsh environments such as oil and gas components.

Desired sealing properties of electrical feedthroughs, in particular GTMS, are, in particular, effective electrical insulation and have effective hermeticity, long-term reliability and/or resistance in specific environments, such as against corrosive substances, vibrations, or temperature fluctuations.

Achieving these properties with sufficient quality can become difficult in designs where electrical conductors are desired to have relatively large diameters in relation to the overall dimensions of the feedthrough and/or are to be arranged in high density. In electronics applications this may be the case, for example, if small dimensions of the feedthrough are desired while at the same time certain connection standards are to be met. Another example may be charging ports in which electrical conductors are desired to provide relatively large landing areas and/or high densities.

What is needed in the art is an electrical feedthrough for electrical conductors having relatively large diameters in relation to the dimension of the through-hole and/or the base body and/or are arranged in high density, while at the same time sealing properties, such as electrical insulation, hermeticity, and long-term reliability are optimized.

SUMMARY OF THE INVENTION

The present invention provides an electrical feedthrough including a base body having a first side and an opposed second side and at least one through-hole extending through the base body from the first side to the second side, an insulating material received in the at least one through-hole, the insulating material having a first surface on the first side of the base body and an opposed second surface on the second side of the base body, and an electrical conductor extending through the insulating material, the electrical conductor having a first diameter at the location of the first surface of the insulating material and a second diameter at the location of the second surface of the insulating material, wherein the first diameter of the electrical conductor is larger than the second diameter of the electrical conductor.

In other words, the diameter of the electrical conductor is larger on the first side of the base body and smaller on the second side of the base body. This allows to optimize the large-diameter side for desired conductor dimensions, while the smaller-diameter side and the profile of the electrical conductor between the two diameters can be optimized for sealing properties such as insulation, hermeticity, long-term reliability and/or resistance against physical or chemical influences.

The electrical conductor may end flush with the first surface of the insulating material on the first side of the base body or may be offset therefrom less than 500 μm, optionally less than 250 μm, optionally less than 100 μm, in particular such that the first surface of the insulating material is grinded flush with the electrical conductor or forms a meniscus which optionally transitions flush to the electrical conductor. In case of an offset, the electrical conductor may be either protruding or recessed with respect to the first surface of the insulating material.

Additionally or alternatively, the electrical conductor may protrude from the second surface of the insulating material on the second side of the base body, wherein the protrusion optionally is more than 500 μm, optionally more than 1 mm, or more than 2 mm.

The electrical conductor may have one or more distinct sections defining the profile of the electrical conductor including the first diameter on the first side of the base body, the second diameter on the second side of the base body and/or the diameter profile between these two diameters.

For example, the electrical conductor may have a first section including the location of the first diameter and extending from the first surface of the insulating material into the insulating material, wherein the first section of the electrical conductor optionally has a constant diameter.

Additionally or alternatively, the electrical conductor may have a second section including the location of the second diameter and extending from the second surface of the insulating material into the insulating material, wherein the second section of the electrical conductor optionally has a constant diameter.

Additionally or alternatively, the electrical conductor may have a tapered section between the location of the first diameter and the location of the second diameter, wherein the tapered section has a tapered diameter and wherein the tapered section optionally is located between the first section and the section within the insulating material.

The aforementioned first, second and tapered sections may be present individually or in any combination. For example, the electrical conductor may have first and second sections with a step transition, i.e. without having a tapered section in between. In another example, the electrical conductor may have a constant-diameter first section which is followed by a tapered section. In yet another example, the electrical conductor may have a tapered section which is followed by a constant-diameter second section, which may be referred to as a direct tapered case. It is also possible that the conductor only includes a tapered section, which may be referred to as a full tapered case. Optionally, due to the decreasing diameter of the electrical conductor from the first side of the base body to the second side of the base body, the amount of surrounding insulating material may increase from the first side to the second side.

The electrical conductor may have a length L between the location of the first diameter and the location of the second diameter, wherein the length L optionally is in the range of 0.2 mm to 10 mm, optionally in the range of 0.3 mm to 5 mm, optionally in the range of 1 mm to 3 mm.

In what follows, relations of lengths and diameters of the electrical conductor and/or sections thereof are provided which in experiments and computer simulations have been shown to be particularly suitable for providing what is needed in the art with respect to the present invention. In particular, it is referred to computer simulation results further below.

In case the electrical conductor has a first and/or a tapered section as mentioned above, the first section of the electrical conductor may have a length L1 and/or the tapered section of the electrical conductor may have a length L3, wherein the length L1, the length L3, or the length L1+L3 is at least 0.1 mm, optionally at least 0.3 mm, optionally at least 0.6 mm.

In case the electrical conductor has a first and/or a tapered section as mentioned above, the first section of the electrical conductor may have a length L1 and/or the tapered section of the electrical conductor has a length L3, wherein the ratio L1/L, the ratio L3/L, or the ratio (L1+L3)/L is smaller than 0.7, optionally is smaller than 0.5, optionally is smaller than 0.35.

In case the electrical conductor has a second section as mentioned above, the second section of the electrical conductor may have a length L2, wherein the ratio L2/L is larger than 0.3, optionally is larger than 0.5, optionally is larger than 0.65.

In case the electrical conductor has first and tapered sections as mentioned above, the tapered section of the electrical conductor may have a length L3, wherein the ratio L3/L1 is between 1.25 and 3.0, optionally between 1.5 and 2.5, optionally between 1.75 and 2.25.

The ratio of the first diameter and the second diameter of the electrical conductor may be between 1.1 and 10, optionally between 1.25 and 3.5, optionally between 1.5 and 3.0, optionally between 1.75 and 2.75.

The first diameter may be at least 0.8 mm, optionally at least 1 mm, optionally at least 1.5 mm.

The second diameter may be at most 1 mm, optionally at most 0.8 mm, optionally at most 0.5 mm.

In case the electrical conductor has a tapered section as mentioned above, the tapered section of the electrical conductor may have a diameter tapering from the first diameter to the second diameter. Additionally or alternatively, the tapered section of the electrical conductor may be a linearly tapering diameter.

In order to increase the mechanical interlock of the electrical conductor with the insulating material, the electrical conductor may include a groove, wherein the groove optionally is located in the second section of the electrical conductor.

The present invention further provides an electrical feedthrough including a base body with at least two through-holes extending through the base body, the base body having a first side and an opposed second side, wherein in each of the at least two through-holes an insulating material is received, each insulating material having a first surface on the first side of the base body and an opposed second surface on the second side of the base body, and wherein in each of the at least two through-holes at least one electrical conductor extends through the respective insulating material. Each of the electrical conductors of the feedthrough may be designed according to one or more of the above-mentioned features. The electrical conductors of the feedthrough are optionally designed identical. However, depending on the application, the conductors may also be designed differently.

Generally, a feedthrough may includes at least two electrical conductors extending through the or each insulating material. Depending on the application, two or more conductors may be used, for example in charging ports or data transfer applications.

Generally, a distance between two electrical conductors may be less than 50 mm, optionally less than 10 mm, optionally less than 5 mm. Such distance may be present at the location of the second diameter, optionally at the location of the first diameter.

Generally, a distance between two electrical conductors may be more than 100 μm, optionally more than 150 μm, optionally more than 200 μm. Such distance may be present at the location of the first diameter, optionally at the location of the second diameter.

Generally, a distance between an electrical conductor and the base body may be less than 5 mm, optionally less than 2 mm, optionally less than 1 mm. Such distance may be present at the location of the second diameter, optionally at the location of the first diameter.

Generally, a distance between an electrical conductor and the base body may be more than 100 μm, optionally more than 150 μm, optionally more than 200 μm. Such distance may be present at the location of the first diameter, optionally at the location of the second diameter. Such distance may be beneficial to have a gap sufficient for flow of insulation material, e.g. glass.

In particular, the above-mentioned distances may refer to a minimum distance between two conductors or between a conductor and the base body, in particular in cases of eccentric conductor(s), off-center conductor location(s) and/or non-uniform through-hole diameter(s).

In some embodiments, the ratio of the surface area of the insulating material received in a trough-hole and the surface area of the electrical conductor or conductors in the respective through-hole on at least one of the sides of the base body, for example the first side, may be less than 15, optionally less than 10, optionally less than 5, or less than 4.

Generally, as mentioned before, the or each electrical conductor may have a first diameter DEC1 at the location of the first surface of the respective insulating material and a second diameter DEC2 at the location of the second surface of the respective insulating material, wherein the diameter(s) of each conductor may be different. Further, the or each through-hole may have a diameter DTH, which optionally is constant throughout the base body, or is tapered, optionally within a range of 2° to 10°, having a maximum diameter DTH, wherein the diameter(s) DTH of each through-hole may be different.

In some embodiments, the ratio DTH/DEC1 of at least one through-hole is at most 1.5, optionally is at most 1.3, optionally is at most 1.2, or is at most 1.11.

In some embodiments, the ratio DTH/DEC2 of at least one through-hole is at most 10, optionally is at most 5, optionally is at most 2.5.

It is noted that the or each through-hole may have a tapering diameter, optionally with a tapering angle in the range of 2° to 10°, wherein the tapering can be in either direction, that is the through-hole diameter may taper towards the second side of the base body or towards the first side of the base body. Advantages of tapered through-holes may in particular be higher pressure resistance and/or improved processing, such as easier part ejection after injection molding process.

In the case of more than one through-hole, each of the at least two through-holes may have a diameter DTH, and each of the at least two through-holes may define a half-distance diameter DBB, the half-distance diameter DBB being the distance ΔTH within the base body between adjacent through-holes plus the diameter DTH of the respective through-hole, wherein the ratio DBB/DTH of at least one through-hole is smaller than 2.0 optionally is smaller than 1.8, optionally is smaller than 1.7, or is smaller than 1.6, or is smaller than 1.5, or is smaller than 1.4, or is smaller than 1.3, or is smaller than 1.2, or is smaller than 1.1.

In case of tapering through-holes, these aforementioned diameters DTH and DBB may optionally be measured on the first side of the base body. Alternatively, however, they may be measured at the second side of the base body.

The aforementioned distances, surface ratios and diameter ratios have proven to be particularly favorable for providing what is needed in the art with respect to the present invention according to experiments and computer simulations. In particular, it is referred to computer simulation results further below.

In addition, experiments and computer simulations have been performed for the contact pressure on the insulating material, wherein negative contact pressure refers to contact tension.

In some embodiments, the insulating material may be under a contact pressure CP2 at the location of the second surface on the second side of the base body, wherein CP2 is a positive contact pressure, or wherein CP2 is a negative contact pressure with an absolute value being less than 30 MPa, optionally less 20 MPa, optionally less than 10 MPa, or less than 5 MPa.

In some embodiments, the insulating material may be under a contact pressure CP1 at the location of the first surface on the first side of the base body, wherein CP1 is a negative contact pressure with an absolute value being more than 1 MPa, optionally more than 5 MPa, optionally more than 10 MPa.

In some embodiments, the insulating material is under a highest positive contact pressure with an absolute value which is lower than 155 MPa, optionally is lower than 70 MPa, optionally is lower than 50 MPa, optionally is lower than 40 MPa, optionally is lower than 20 MPa.

Generally, a feedthrough's base body may have a thermal expansion coefficient between $5\times10^{-6}K^{-1}$ and $25\times10^{6}K^{-1}$, optionally between $5\times10^{-6}K^{-1}$ and $20\times10^{-6}K^{-1}$.

Generally, a feedthrough's insulating material may have a thermal expansion coefficient between $3\times10^{-6}K^{-1}$ and $15\times10^{-6}K^{-1}$, optionally between $5\times10^{-6}K^{-1}$ and $12\times10^{-6}K^{-1}$.

Generally, a feedthrough's electrical conductor may have a thermal expansion coefficient between $3\times10^{-6}K^{-1}$ and $25\times10^{-6}K^{-1}$, optionally between $5\times10^{-6}K^{-1}$ and $20\times10^{-6}K^{-1}$.

The base body may include at least one of the following materials: metal, austenitic stainless steel, optionally AISI 300 series, ferritic stainless steel, optionally AISI 400 series, titanium, inconel, duplex stainless steel, niobium, an alloy of one of the aforementioned metals, e.g. titanium alloy, ceramic. In case the base body includes metal and the insulating material includes glass, the feedthrough may be referred to as glass-to-metal seal. In case the base body includes ceramics and the insulation material includes glass, the feedthrough may be referred to as glass-to-ceramics seal.

The insulating material may include at least one of the following materials: glass, glass ceramic, ceramic.

The electrical conductor may include at least one of the following materials: metal, metal alloy, stainless steel 300 series, stainless steel 400 series, titanium, NiFe, NiFeCo alloy, niobium, copper, tungsten, molybdenum, platinum, an alloy of one of the aforementioned metals, e.g. titanium alloy or copper alloy.

In some embodiments, the base body and the electrical conductor may only include non allergic materials, wherein the base body and the electrical conductor optionally are free of nickel leaching.

In particular, the present invention relates to a charging port or medical port for electronic devices, in particular wearables, including an electrical feedthrough as described above.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
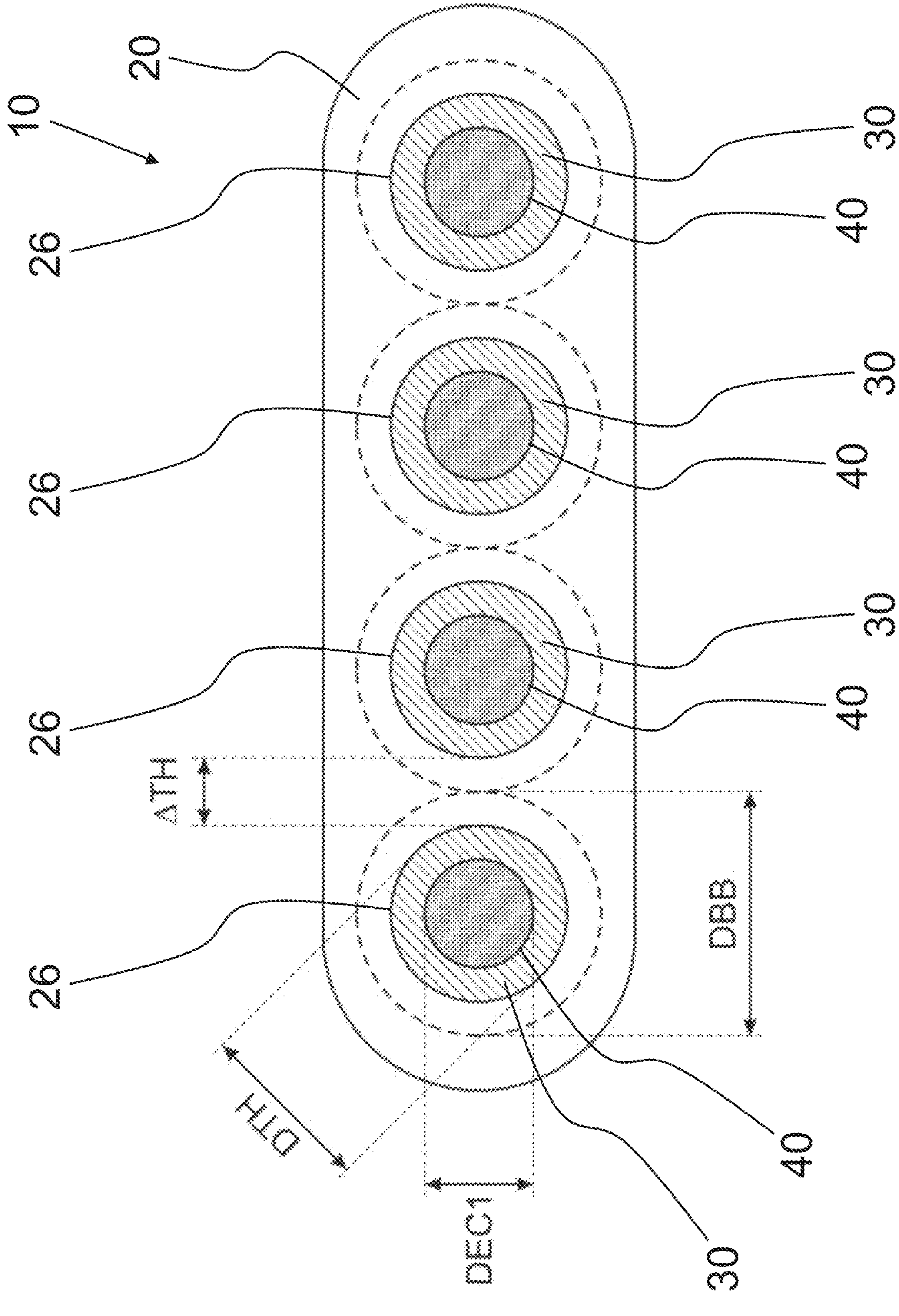
FIG. 1 is a top view of an electrical feedthrough including 4 through-holes, wherein an electrical conductor extends through each through-hole.
Figure 2:
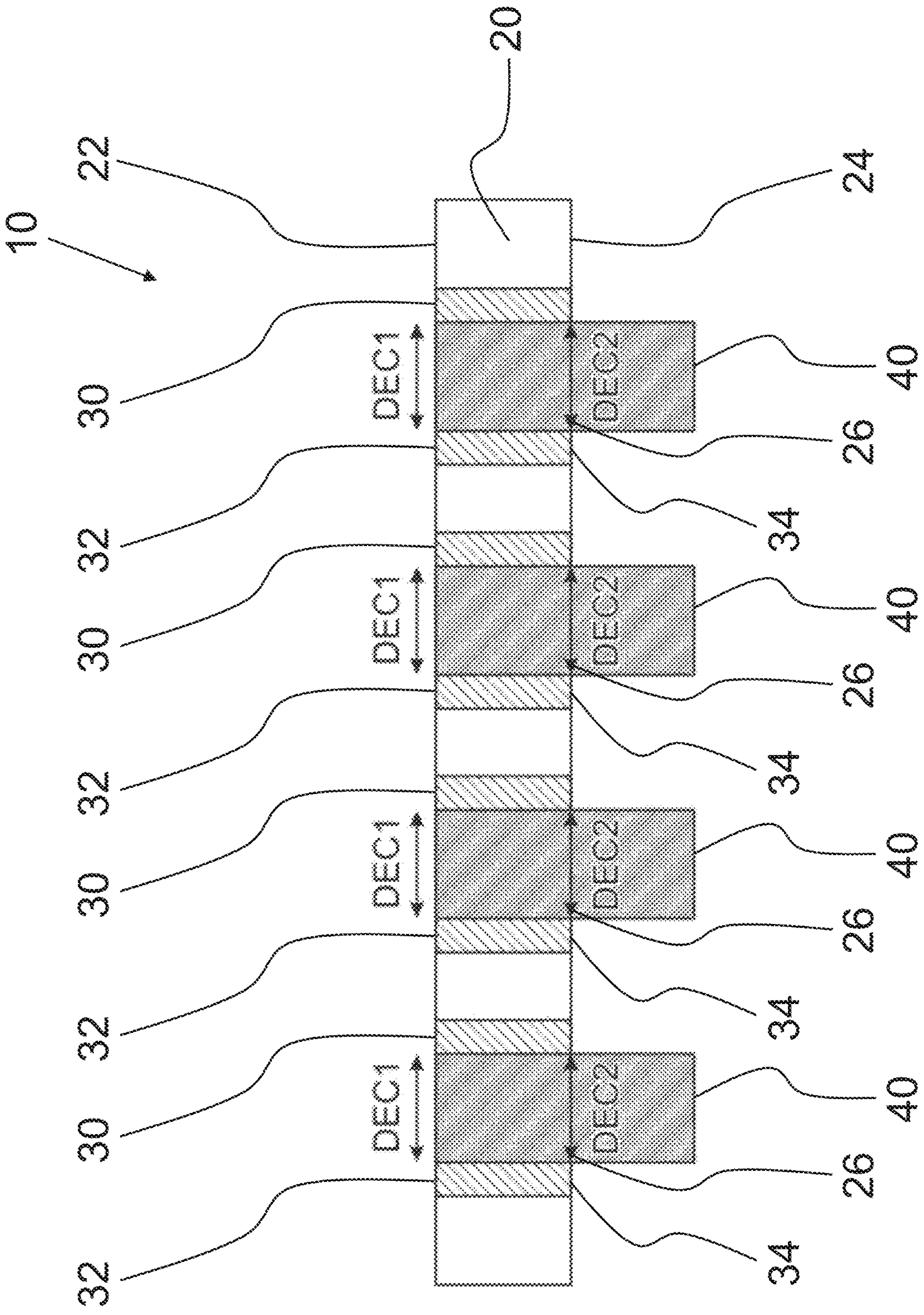
FIGS. 2-4 are side views of 3 different electrical feedthroughs including 4 through-holes, wherein an electrical conductor extends through each through-hole.

Referring to FIG. 1-5, an electrical feedthrough 10 with a base body 20 may include one or more through-holes 26 in which an insulating material 30 and at least one electrical conductor 40 is received. The electrical conductor may also be referred to as electrical pin.

For several practical applications, it may be desired to provide feedthroughs 10 with relatively thick electrical conductors 40 in relation to the diameter of the through-hole DTH, to the distance between adjacent through-holes ΔTH and/or to a half-distance diameter DBB=DTH+ΔTH, while at the same time hermeticity, electrical insulation between conductors 40 and/or the base body 20 or other properties of the sealing should satisfy certain quality requirements.

Multiple approaches may be considered for this purpose. In particular, instead of using electrical conductors 40 with constant diameter DEC1=DEC2 (FIG. 2), conductors 40 with a larger diameter DEC1 on a first side 22 of the base body 20 and a smaller diameter DEC2 on a second side 24 of the base body 20 may be employed (FIG. 3-5).

For example, the first side 22 of the feedthrough 10 on which the electrical conductor 40 has a larger diameter DEC1 may be facing the exterior of a device, whereas the second side 24 of the feedthrough 10 on which the electrical conductor 40 has a smaller diameter DEC2 may be facing the interior of a device.

Such asymmetrical pin diameters (for example external and internal) may increase performance and/or optimize desired dimension ratios of the feedthrough 10. On the one hand, a larger pin external diameter DEC1 can provide higher contact area which may be beneficial for a mating contact area. This may be especially helpful in case of tolerances of a mating component, which may be pogo pins. On the other hand, a smaller internal pin diameter DEC2 may allow relatively small flex outlines. The internal pin end may be mated to another component through various ways, such as by soldering.

Figure 3:
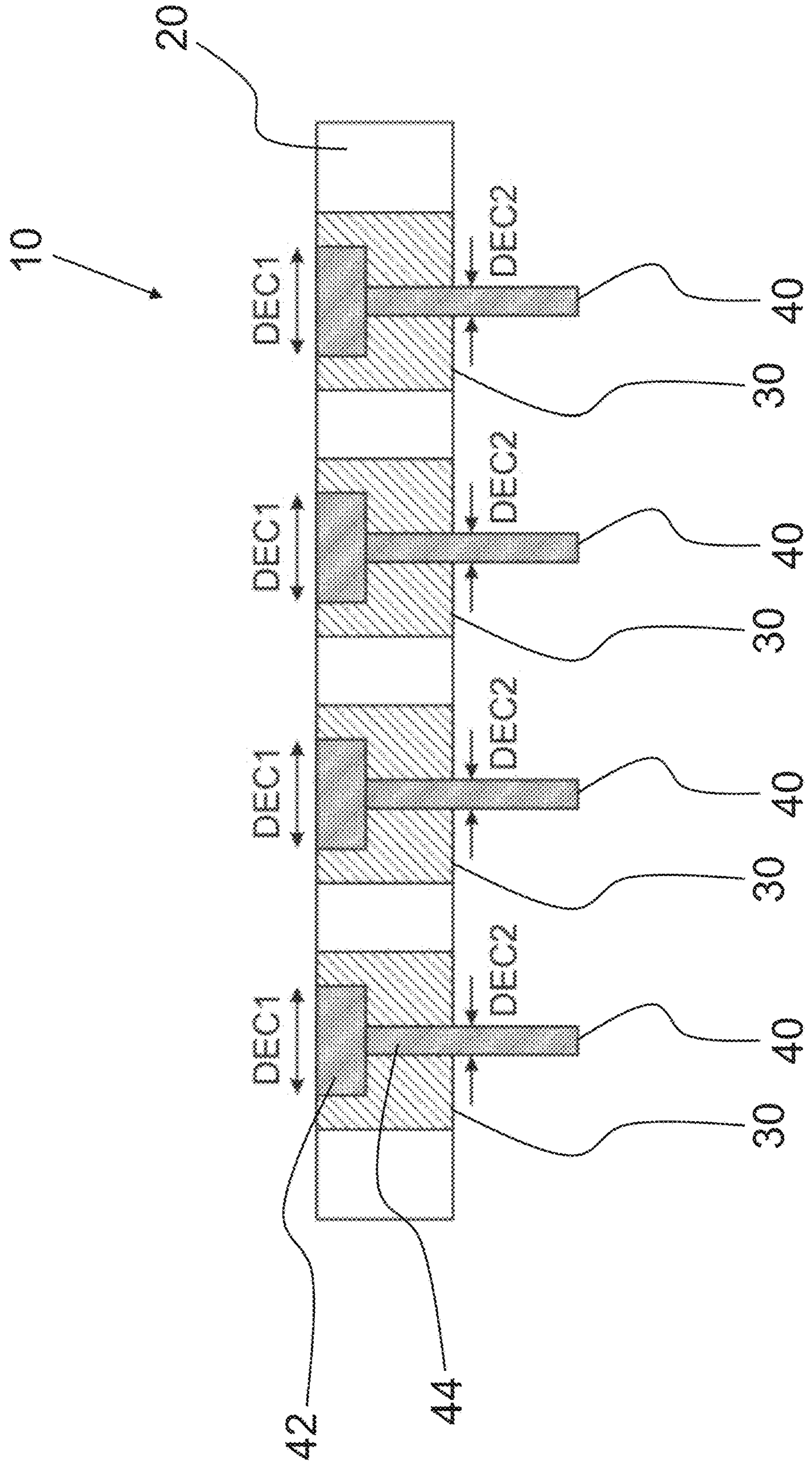
Figure 4:
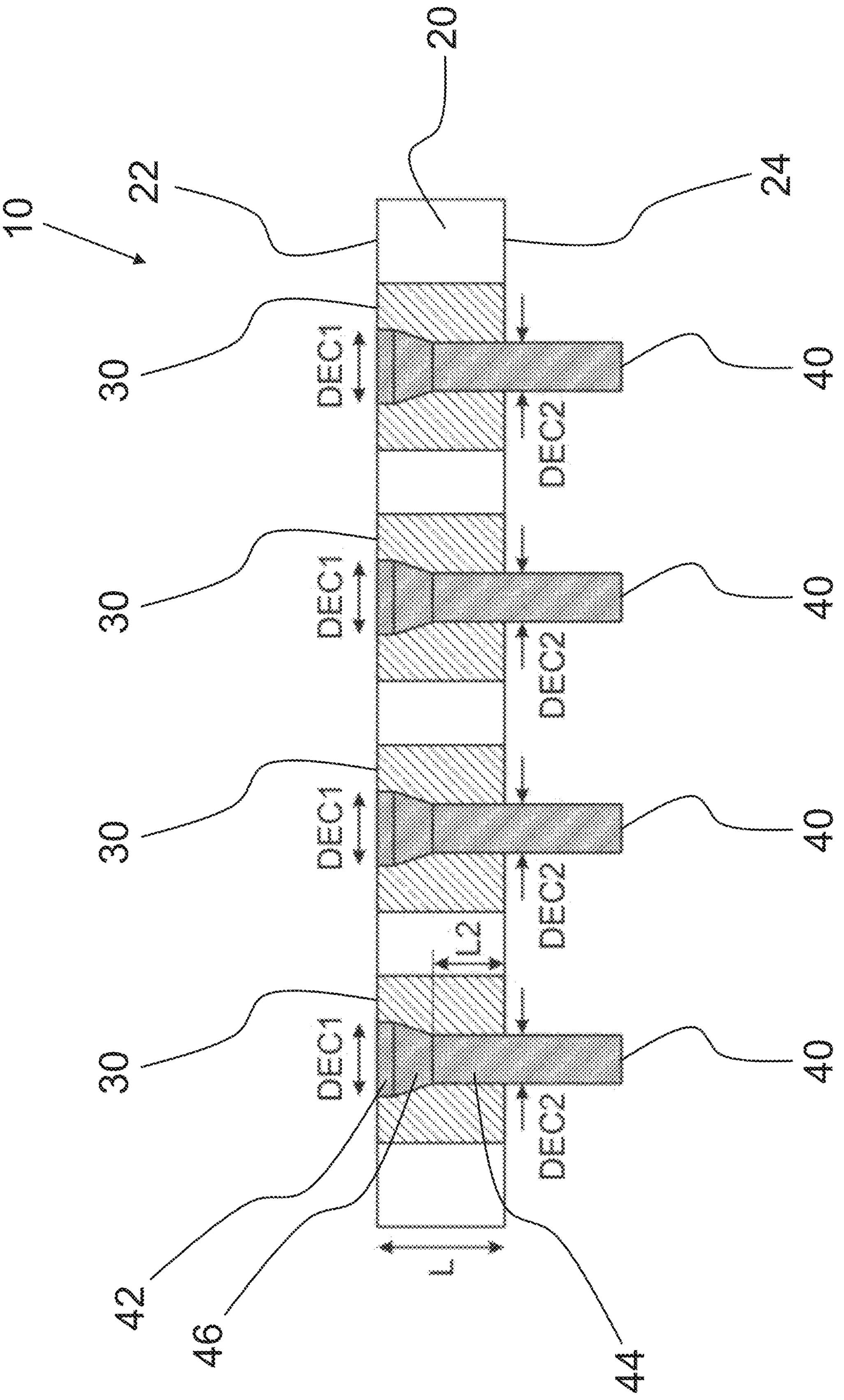

According to one embodiment, asymmetrical pin diameters DEC1>DEC2 may be realized with a step design (FIG. 3). In this case, the electrical conductor 40 has a first section 42 with the first diameter DEC1 extending from the first surface 32 of the insulating material 30 into the insulating material 30 and a second section 44 with the second diameter DEC2 extending from the second surface 34 of the insulating material 30 into the insulating material and a vertical step in between these two sections 42, 44.

In some cases of GTMS, where the insulation material 30 is glass, depending on the dimensions of the components of the feedthrough 10 and processes used, such step design may lead to situations during glass sealing process whereby the glass flow is insufficient to cover the entire cavity. In such cases bubbles or gaps may result at certain locations which creates risks of leakage. Also in some cases of GTMS, the sharp corners of the step pin design, may lead to high stress areas which may be prone to glass cracks which may also lead to risk for leakage.

However, such problems are only expected under specific conditions and/or dimensions of the components of the feedthrough 10 and can be solved by suitable processes and/or materials, as detailed further below.

Alternatively or additionally, a tapered pin design may be beneficial (FIG. 4-5). In this case, the electrical conductor 40 may have a first section 42 with the first diameter DEC1 extending from the first surface 32 into the insulating material 30 and a second section 44 with the second diameter DEC2 extending from the second surface 34 into the insulating material as well as a tapered section 46 between these two sections 42, 44 (FIG. 4, 5*a*, 5*b*).

Figure 5B:
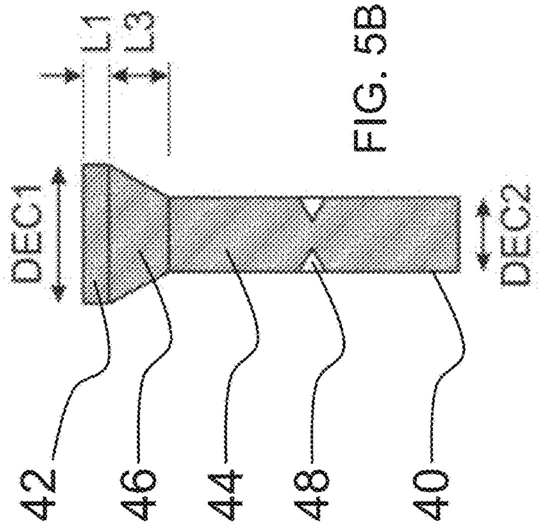
FIGS. 5A, 5B, 5C, 5D, and 5E are side views of 5 different electrical conductors.
Figure 5E:
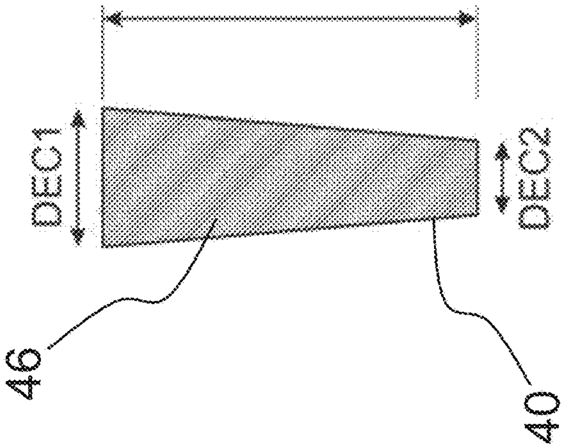
Figure 5D:
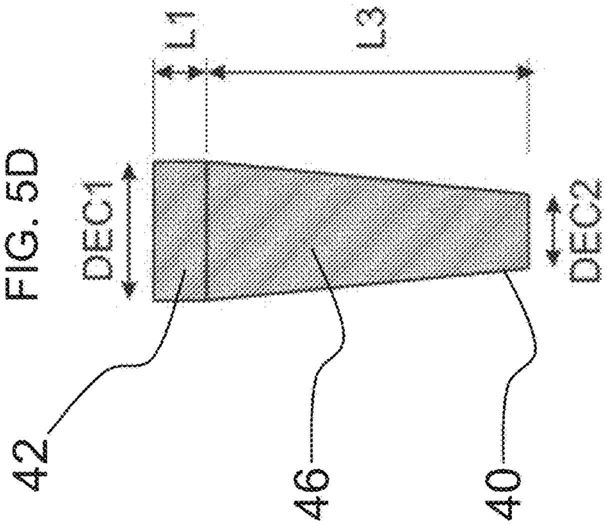
Figure 5A:
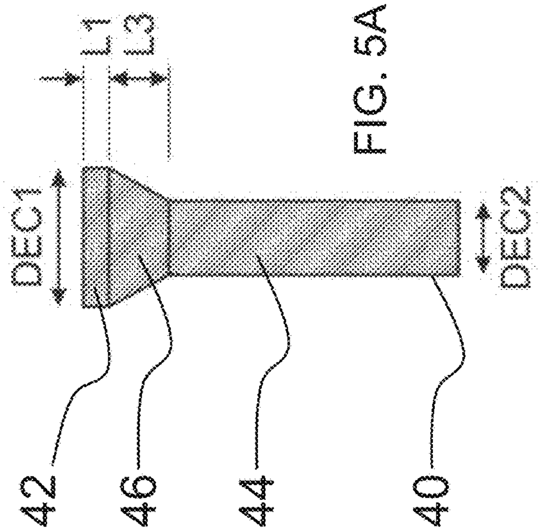
Figure 5C:
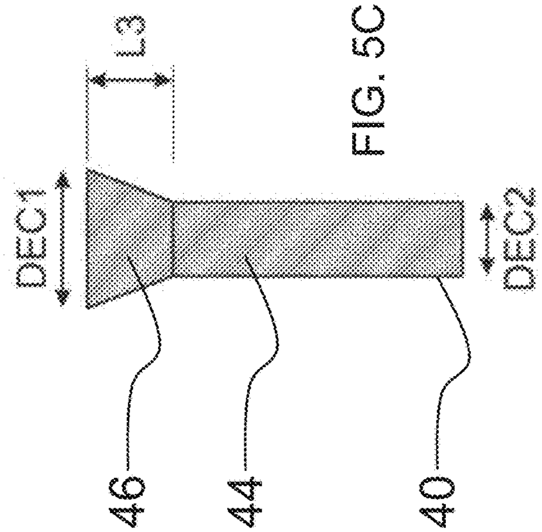

However, the electrical conductor 40 may also be designed to have a tapered section 46 with the first diameter DEC1 followed by a second section 44 with the second diameter DEC2 (FIG. 5*c*). Conversely, the electrical conductor 40 may also be designed to have a first section 42 with the first diameter DEC1 followed by a tapered section 46 including the second diameter DEC2 (FIG. 5*d*). Furthermore, it is also possible that the electrical conductor 40 is tapering from the first diameter DEC1 at the first surface 32 up to the second diameter DEC2 at the second surface 34 of the insulating material 30 (FIG. 5*e*). Note that in FIGS. 5*d* and 5*e* the second diameter DEC2 may be at any position within the tapering section 46 or at its end, depending on where the second surface 34 of the insulating material 30 is located.

In addition, to allow for a stronger mechanical interlock between the insulation material 30 (e.g. glass) and the conductor 40, one or more grooves 48 can be implemented on the conductor 40 so that insulation material 30 can flow into the conductor to create e.g. a Velcro interlock.

Electrical conductors 40 may be produced for example by CNC, MIM and/or forging, in particular in the case of tapered designs.

Generally, asymmetric pin designs have shown to increase GTMS performance, for example mechanical robustness and/or hermeticity, in particular for the soldering area in glass-to-metal seal systems. Tapered pin designs may improve insulation material flow (lesser constriction areas) in production, and, thus, may reduce the risk of bubbles, cracks, and/or lower the stress due to less sharp corners, in particular for glass insulation material (GTMS).

Referring to FIGS. 6-16, it is illustrated that asymmetric conductor designs (DEC1>DEC2), and in particular tapering designs, improve contact pressure conditions on the components of the feedthrough leading to better hermeticity and/or mechanical robustness, e.g.

for a soldering process. Contact pressure has a direct relation to mechanical robustness and seal integrity of the feedthrough.

Figure 6A:
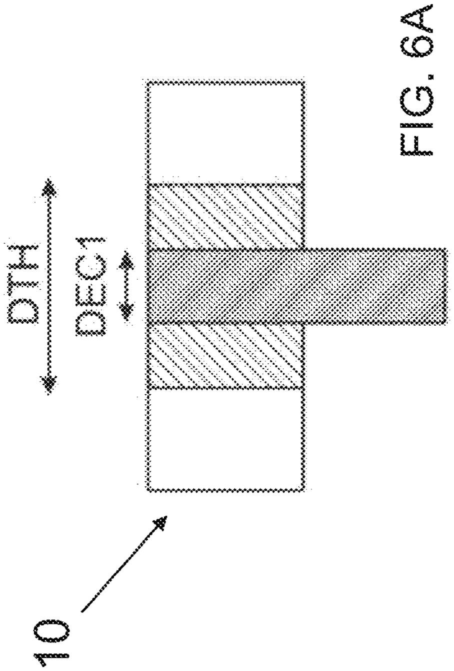
FIGS. 6A, 6B, 6C, and 6D are side views of 4 different electrical feedthroughs including 1 through-hole, wherein an electrical conductor extends through the through-hole.
Figure 6B:
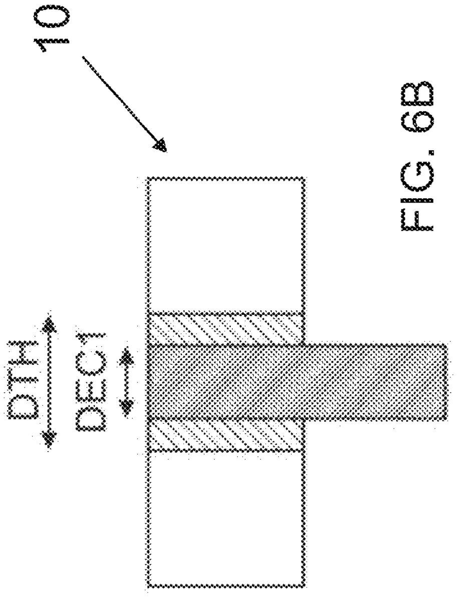
Figure 6C:
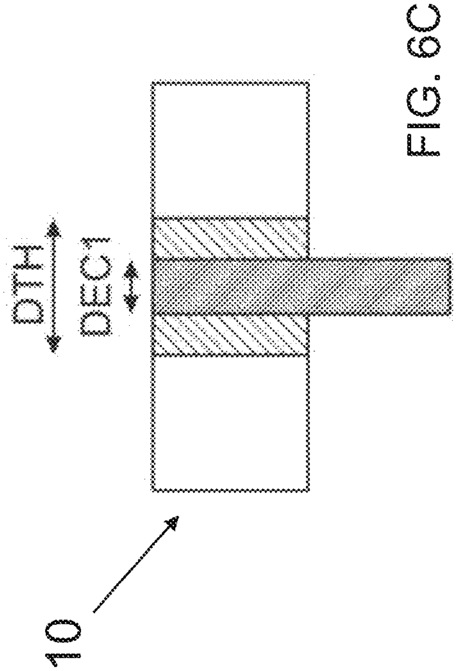
Figure 6D:
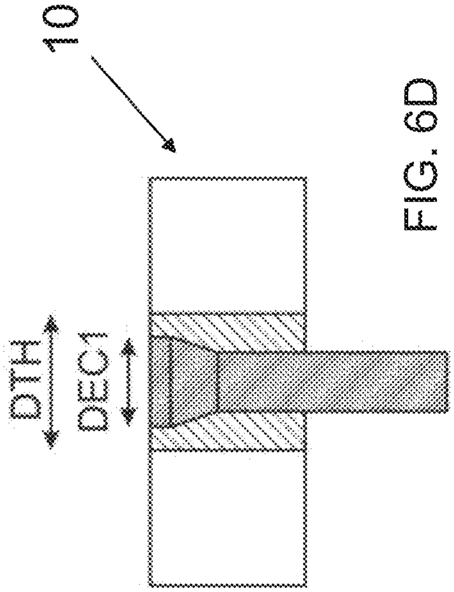

Four variants of pin/glass systems were constructed and analyzed to illustrate relationships between pin thickness, glass thickness and the robustness of the glass-to-metal seal system: A first variant refers to a glass/pin system with typical design guidelines, i.e. glass with nominal gap (FIG. 6*a*). A second variant refers to a system with increased pin diameter, i.e. a thick pin and narrow glass gap (FIG. 6*b*). A third variant refers to a system with decreased pin diameter with a narrow glass gap, i.e. a thin pin and narrow glass gap (FIG. 6*c*). A fourth variant refers to an asymmetric pin design having a larger landing zone on the external side for contact and thinner internal diameter for smaller soldering outline, i.e. a “nailhead” pin design (FIG. 6*d*).

Figure 7:
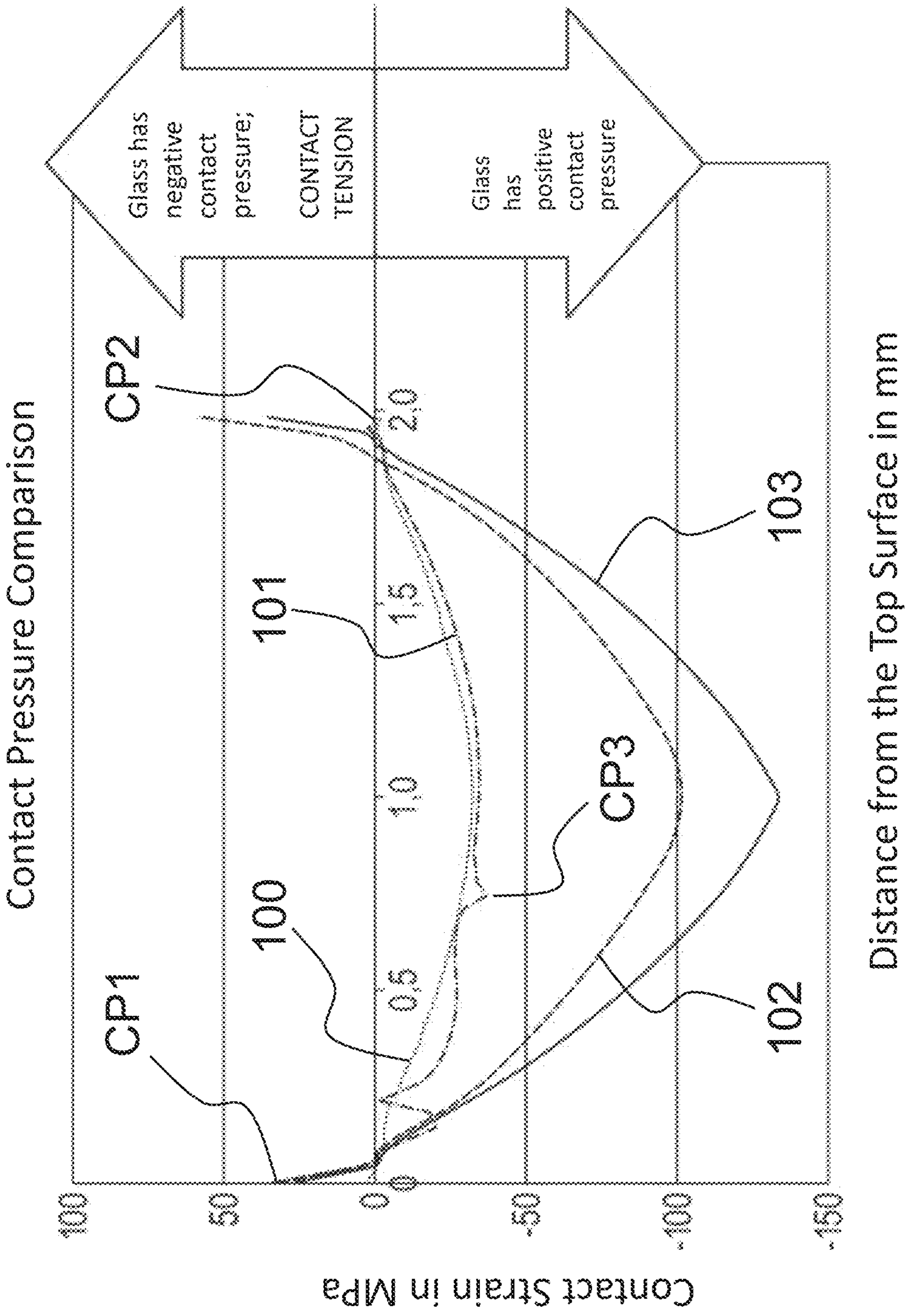
FIG. 7 shows computer simulation results for the contact pressure on the insulation material for the 4 different electrical feedthroughs of FIGS. 6A-6D.
Figure 8B:
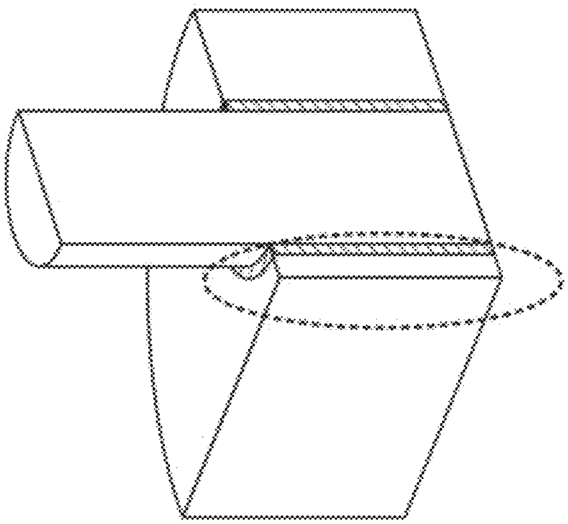
FIGS. 8A and 8B are perspective views of 2 different electrical conductors in a through-hole.
Figure 8A:
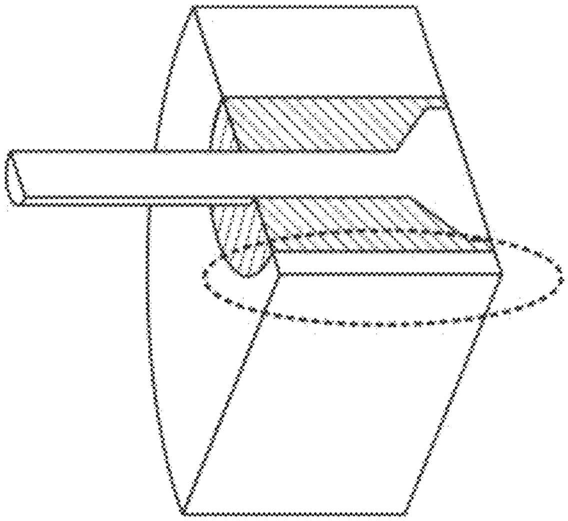
Figure 9A:
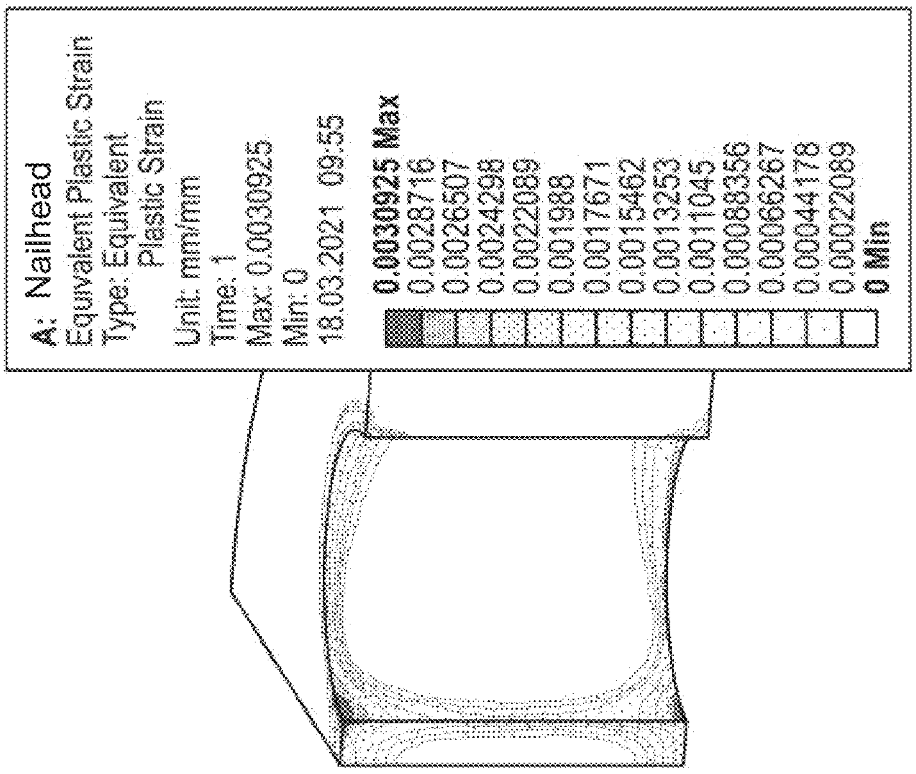
FIGS. 9A, 9B, 10A, 10B, 11A, 11B, 12A, 12B, 13A, 13B, 14A, 14B, 15A, 15B, 16A, and 16B show computer simulation results for the level of plastic deformation of the base body and the contact pressure in the insulation material for the 2 different electrical conductors of FIGS. 8A-8B and corresponding results with different separating wall distances.
Figure 9B:
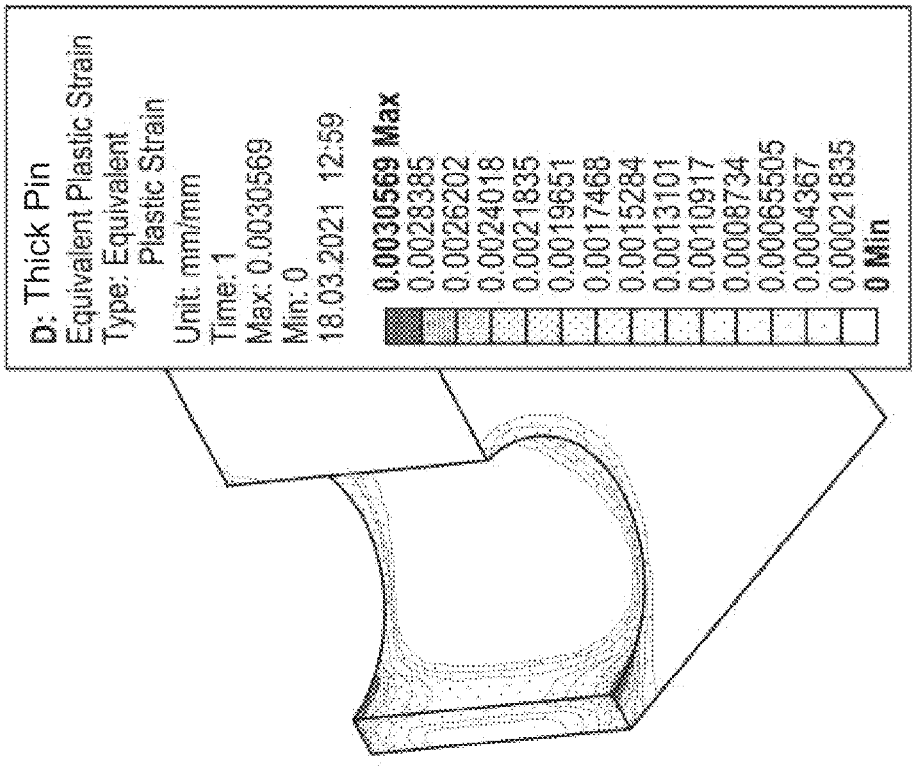
Figure 10A:
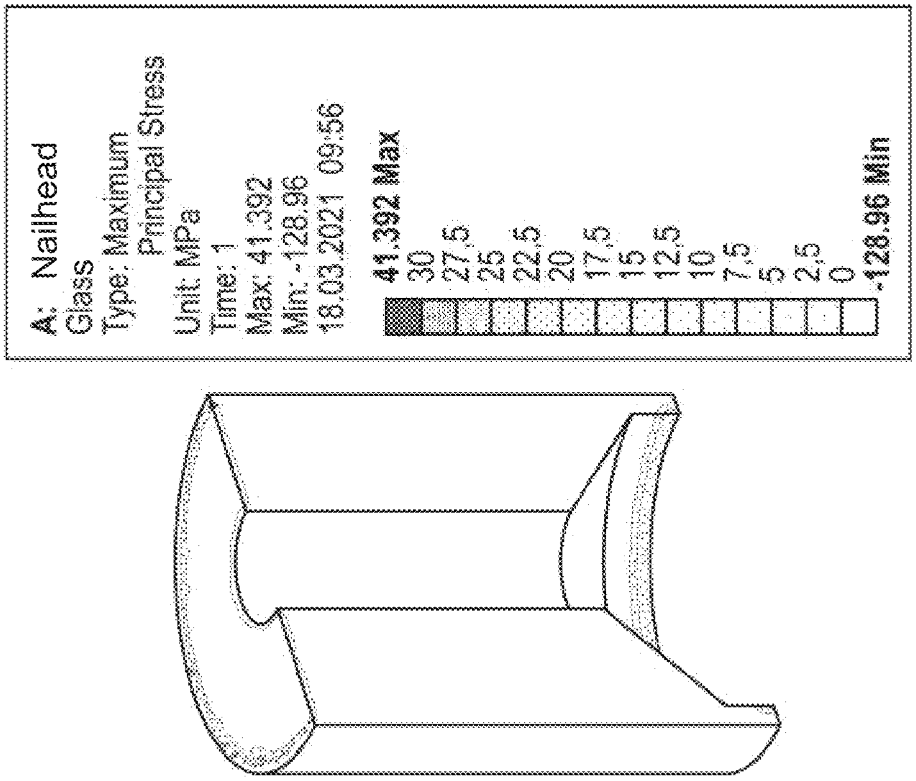
Figure 10B:
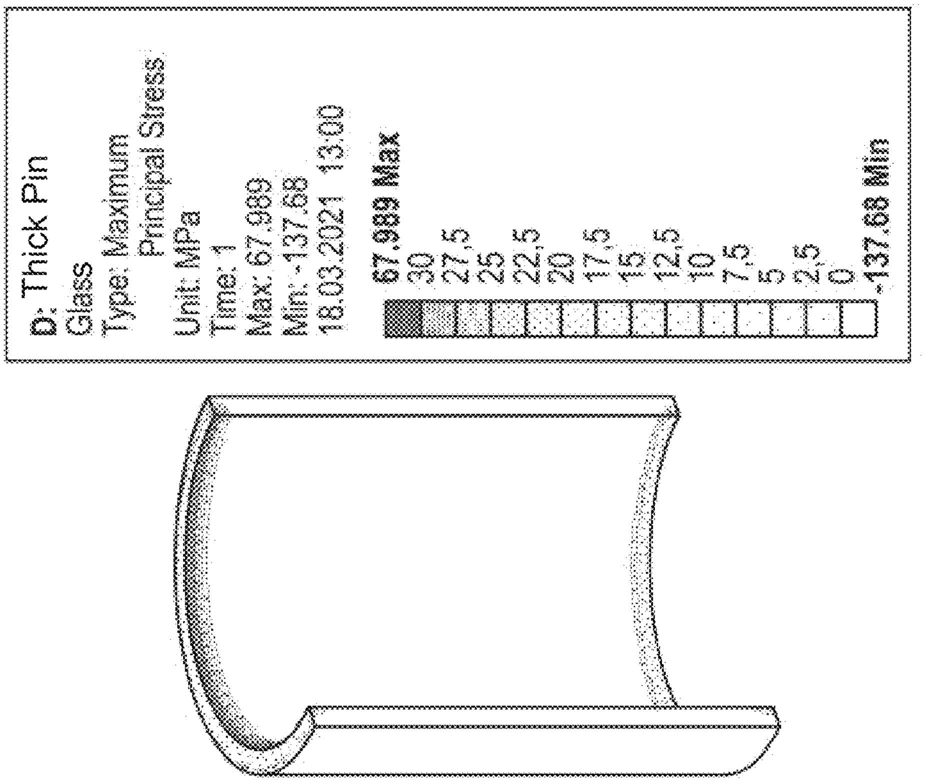
Figure 11A:
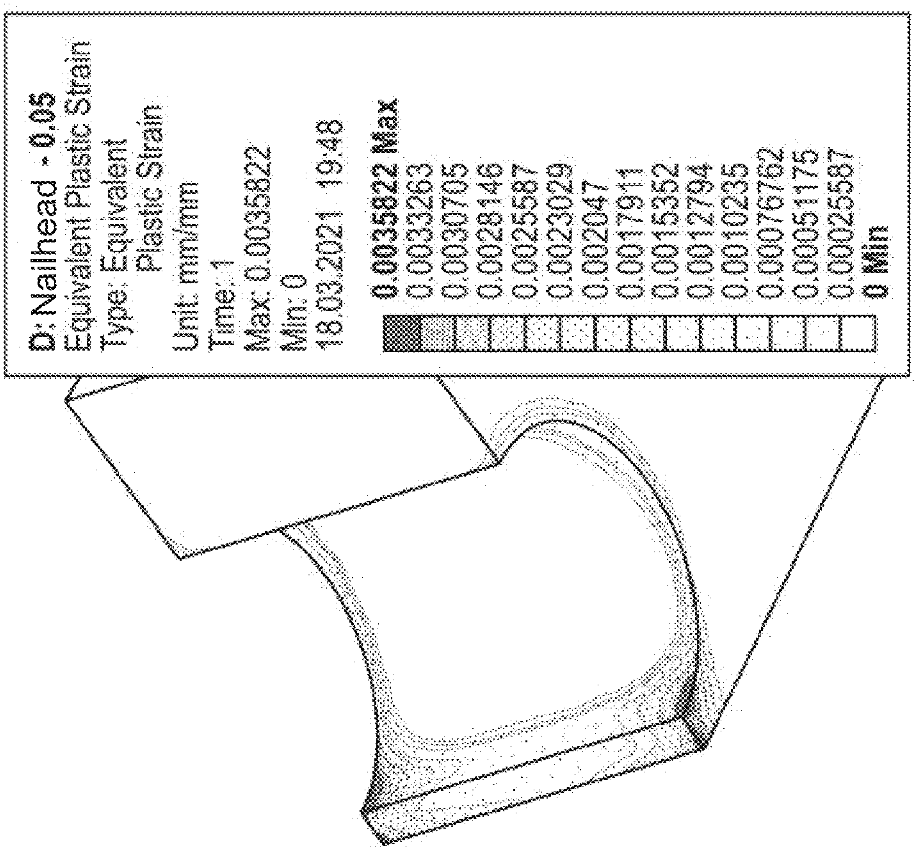
Figure 11B:
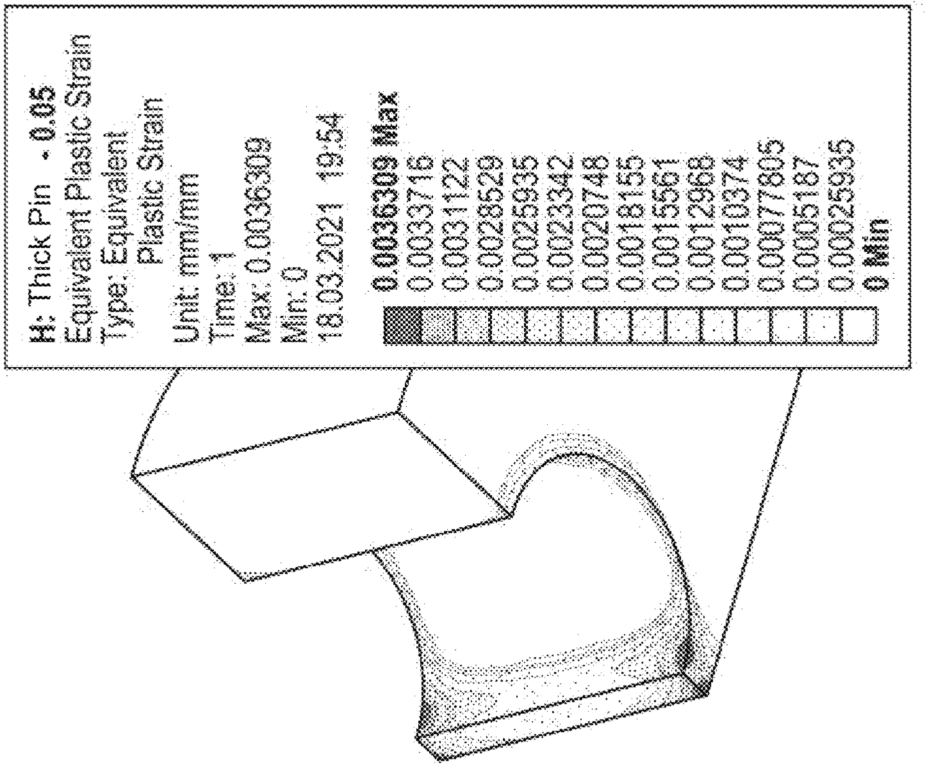
Figure 12B:
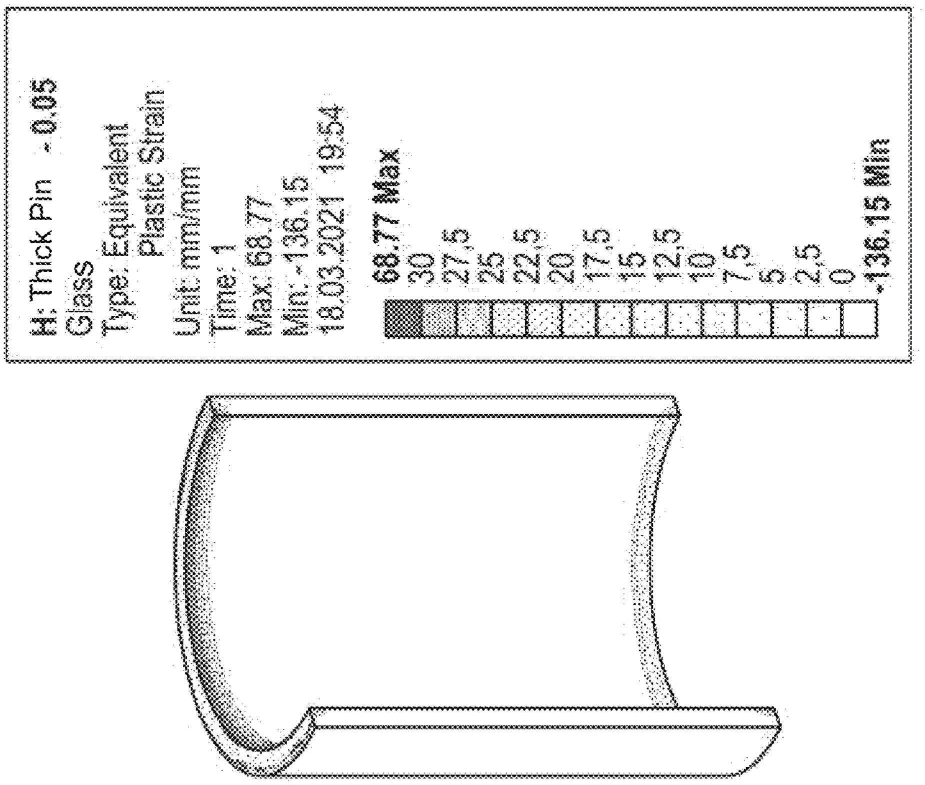
Figure 12A:
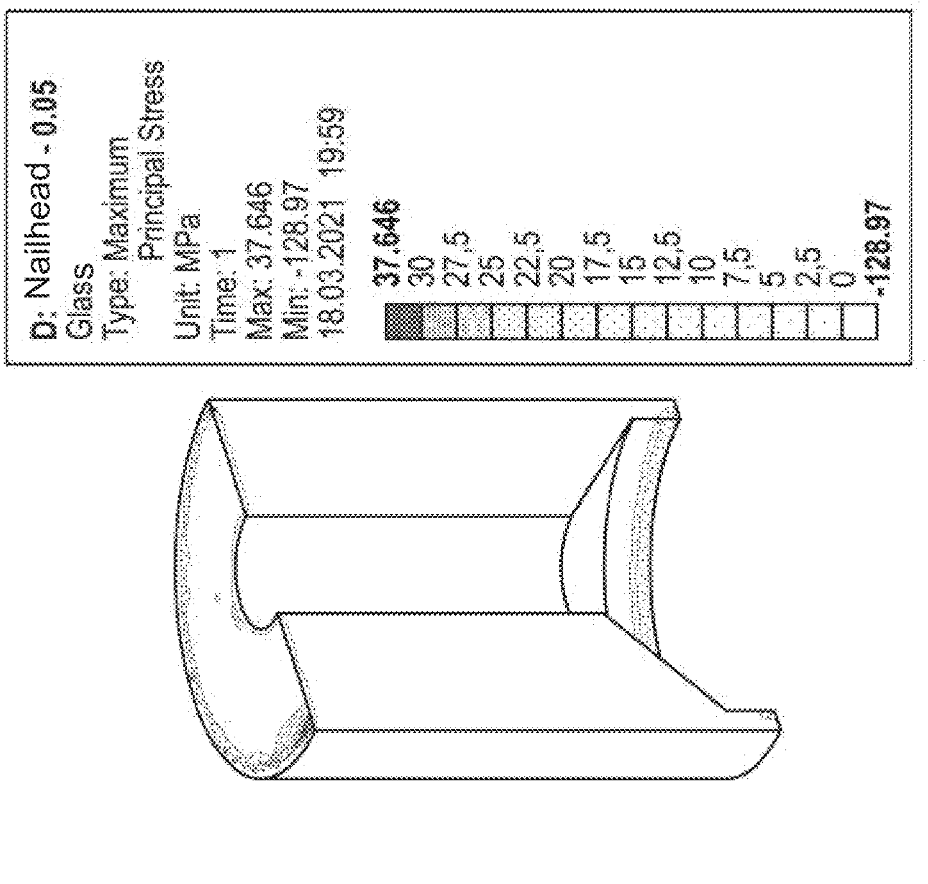
Figure 13A:
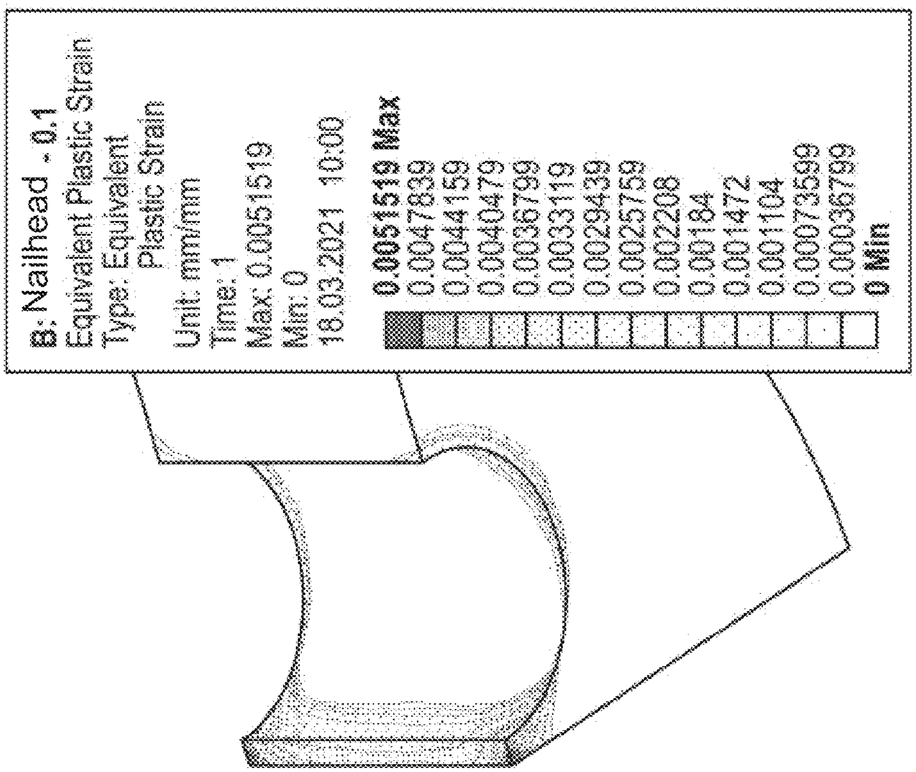
Figure 13B:
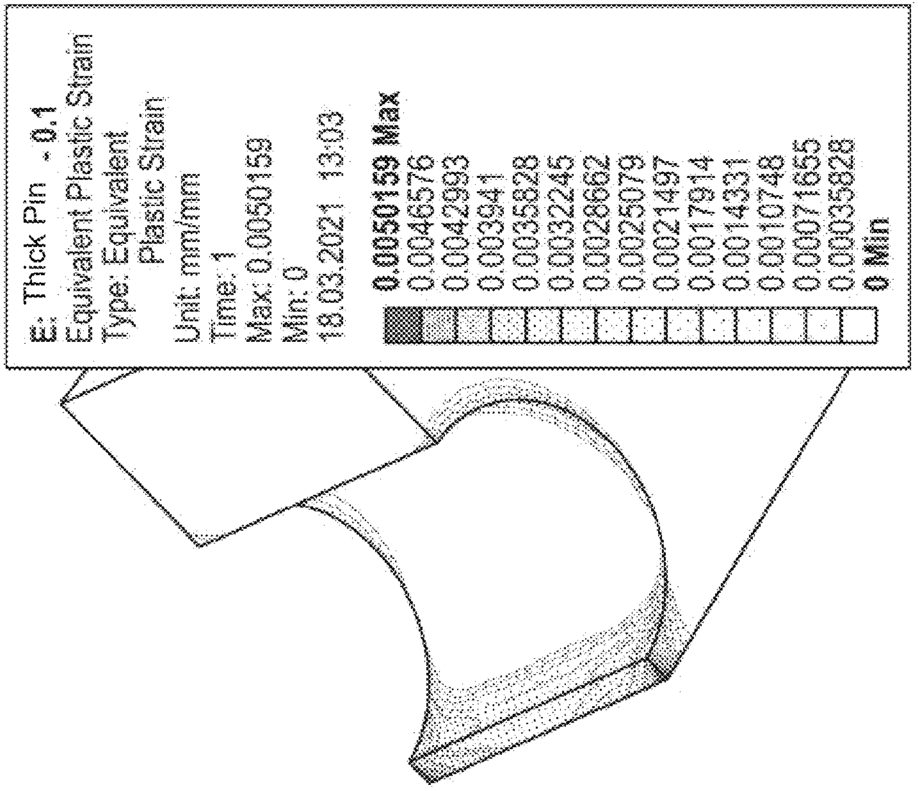
Figure 14A:
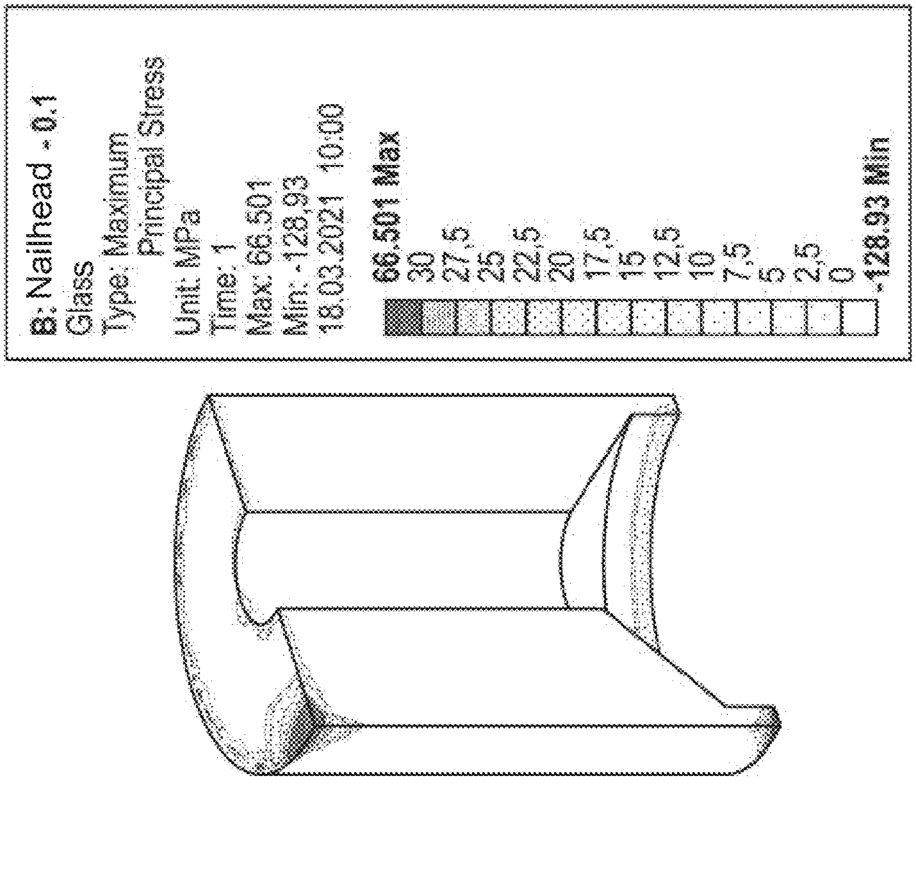
Figure 14B:
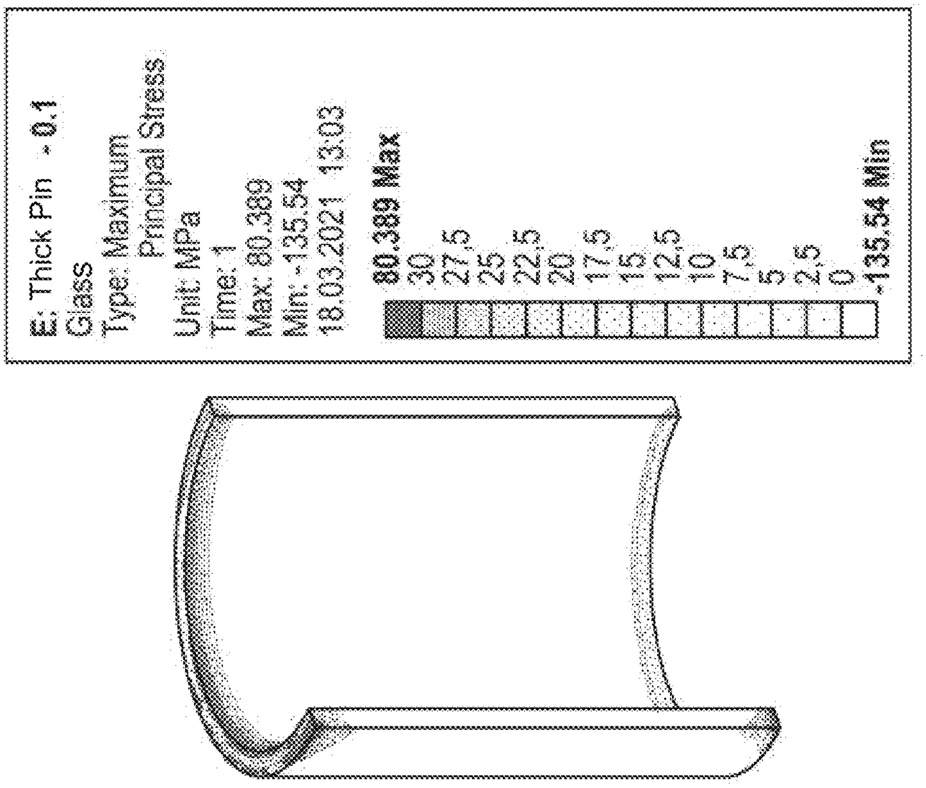
Figure 15A:
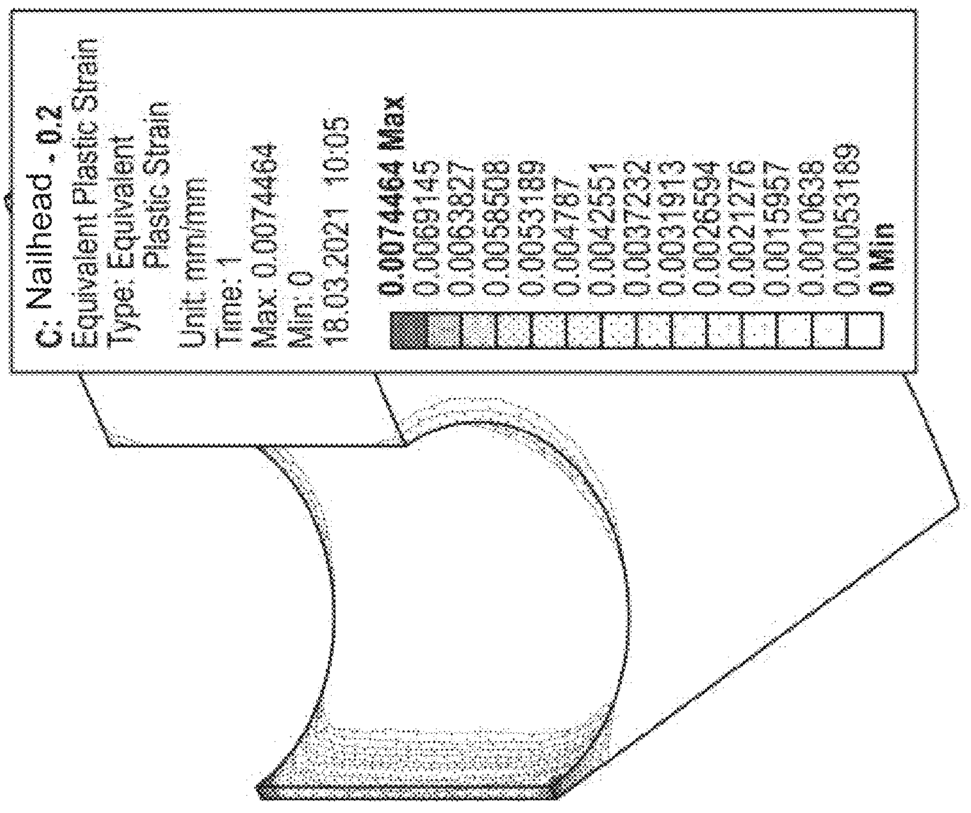
Figure 15B:
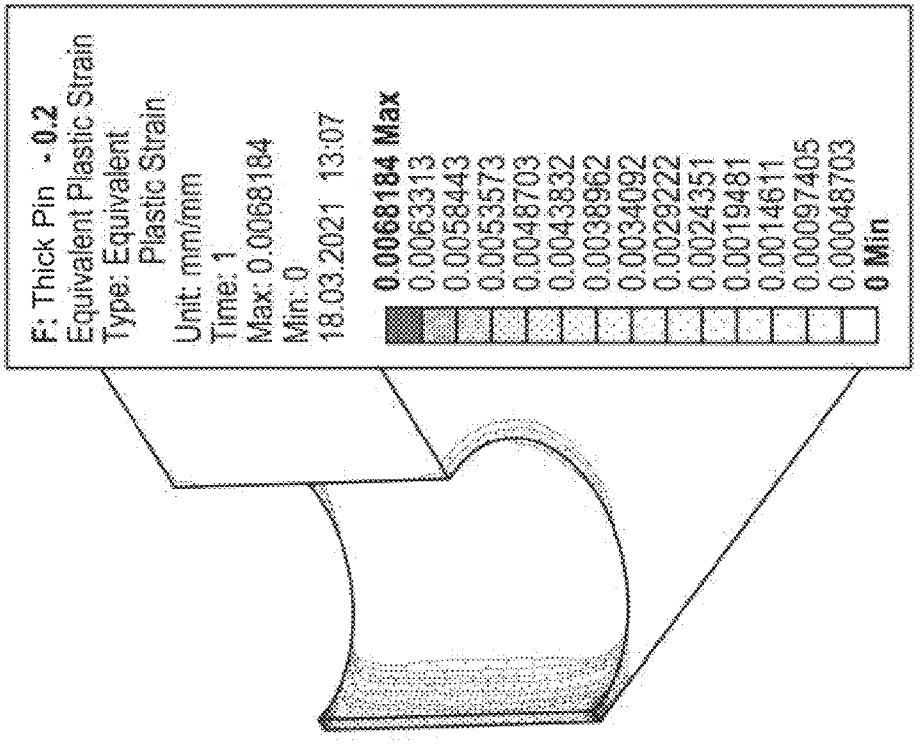
Figure 16B:
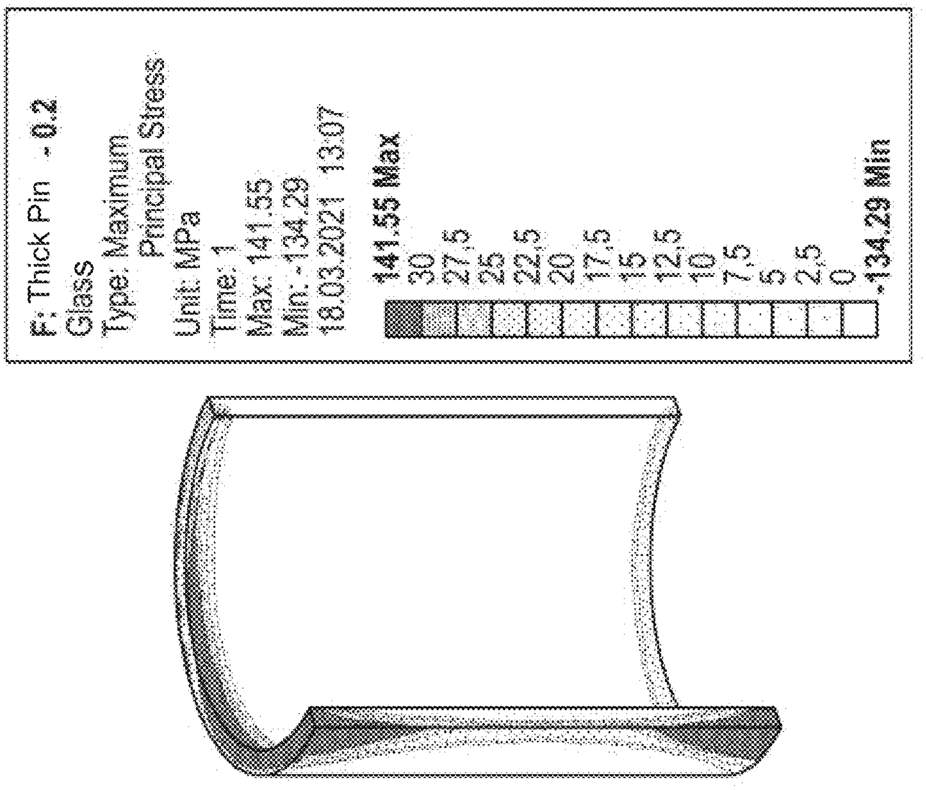
Figure 16A:
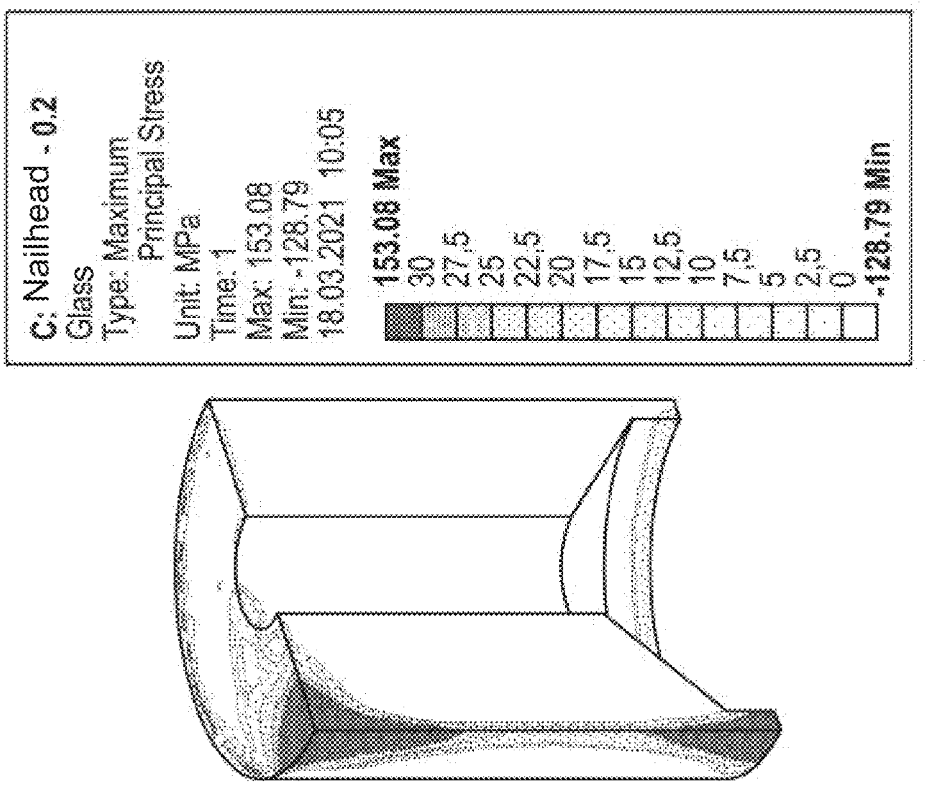

For these 4 variants, computer simulation results of the contact pressure on the insulation material (glass) are illustrated in FIG. 7. Aforementioned first variant (glass with nominal gap) is curve 100, second variant (thick pin and narrow glass gap) is curve 102, third variant (thin pin and narrow glass gap) is curve 103, and fourth variant (nailhead design) is curve 101. The thickness L of the feedthrough (see FIG. 4) is 2 and x-axis value of 0 corresponds to the first side 22 of the base body (e.g. external area) and x-axis value of 2 corresponds to the second side 24 (e.g. internal area with protrusion for soldering).

It is found that for the first variant 100, the insulation material has superior contact strain at its surfaces (x=0, x=2) as compared to the second and third variants 102, 103, where the insulation material is under negative contact pressure (i.e. contact tension). However, for the fourth variant 101 the insulating material has superior contact strain as compared to the second and third variants 102, 103. In particular, on the second surface (x=2), the insulation material is under negative contact pressure CP2 with an absolute value being lower as compared to the second and third variants 102, 103, or is under a positive contact pressure CP2.

Such contact pressure, in particular positive contact pressure, on the glass indicates a more robust glass sealing system which in turns help in the mechanical robustness of the pins on the second side (e.g. soldering side). This may be of particular advantage as pins at the soldering side are subjected to heat mechanical stresses during the soldering process.

In the nailhead design, the pressure does not get build up over the nail head pin system. Moreover, in the nail head pin system, the insulating material may be under highest positive contact pressure CP3 with an absolute value which is lower than 45 MPa, or lower than 35 MPa.

To support the aforementioned findings, FIGS. 8-16 show further computer simulation results for a nailhead pin design (a) and a straight pin design (b) for the level of plastic deformation of the base body (FIG. 9, 11, 13, 15) and the contact pressure in the insulation material (FIG. 10, 12, 14, 16) for different separating wall distances: 2.21 mm; 2.11 mm; 2.01 mm; and 1.81 mm.

Figure 17B:
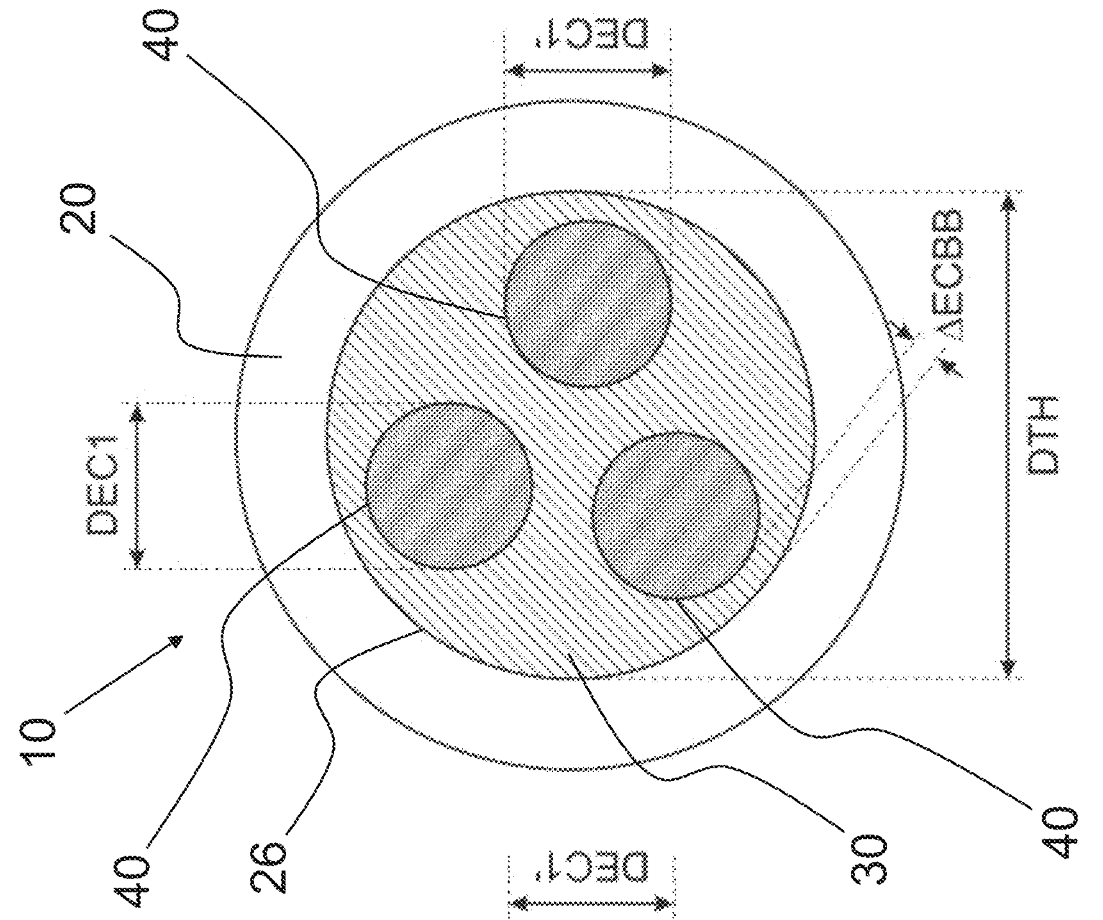
FIGS. 17A and 17B are top views of 2 different electrical feedthroughs including 3 electrical conductors.
Figure 17A:
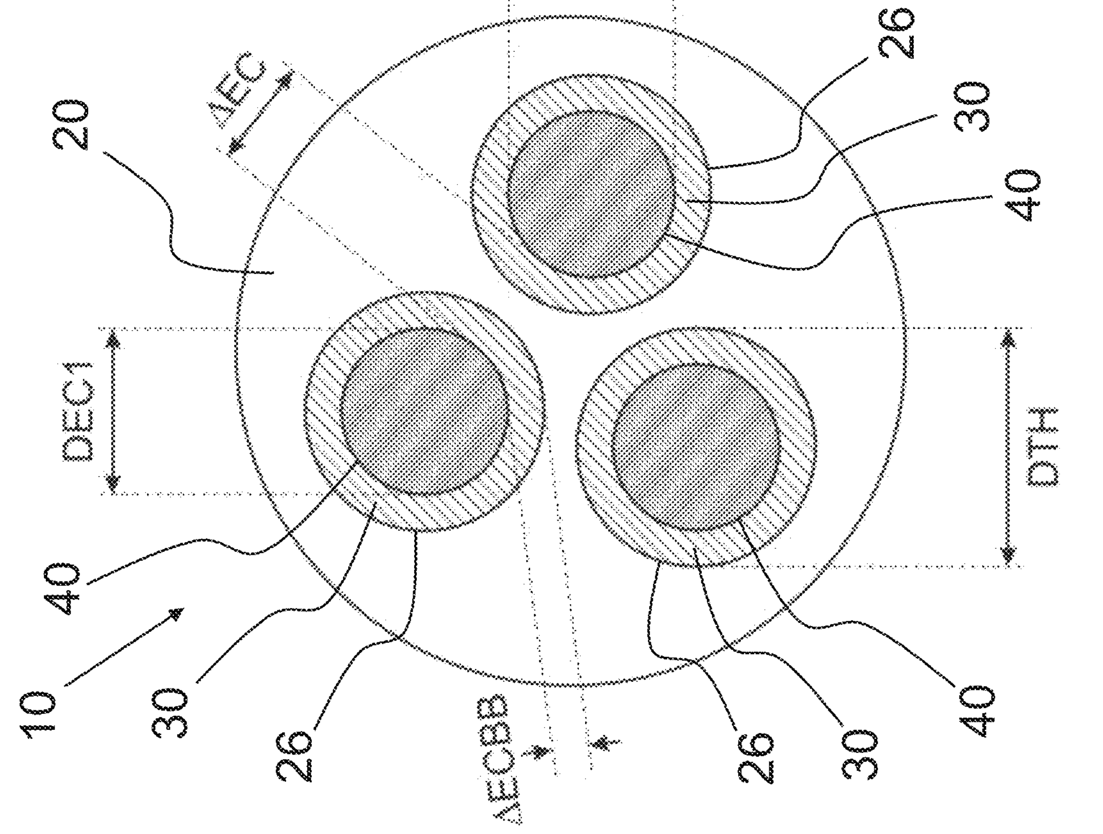

Referring to FIG. 17 an electrical feedthrough including multiple electrical conductors 40 may have an individual through-hole 26 for each conductor 40 (FIG. 17*a*) or may have multiple electrical conductors 40 extending through the same through-hole 26 (FIG. 17*b*).

In both cases, aforementioned pin designs enable systems with optimized sealing properties while at the same time distances ΔEC between two electrical conductors and/or distances ΔECBB between an electrical conductor and the base body may be decreased, in particular to allow for high density pin configurations (typically a lower pitch distance corresponds to a higher density of pins for a given area).

Additionally or alternatively, providing feedthroughs having decreased ΔEC, decreased ΔECBB and/or allow for a desired electrical conductor diameter in relation to DTH, ΔTH and/or DBB (FIG. 1), while at the same time sealing properties meet high quality standards, can be achieved by material selection and/or selection of thermal expansion coefficients (CTE).

For example, the selection of metal housing may have an impact on the pin-to-pin (pitch) spacing. To achieve high levels of corrosion resistance and reliability performance, metals like stainless steel or Ti can be utilized. For metals with high CTE, e.g. 316L, pitch spacing may be higher compared to metals like stainless steel 400 series and Ti. For a low weight, high reliability, high density glass-to-metal seal and/or biocompatibility, Ti may be chosen as material for the base body and/or pins. The base body and/or the pins may be optionally Non-Ni materials or free of nickel leaching.

In one exemplary embodiment, the base body may include SS316L and DBB/DTH may be 1.6. In another exemplary embodiment the base body may include SS400 series/Ti and DBB/DTH may be 1.3.

In one exemplary embodiment, the base body may include SS316L and the conductor may include SS316L. In another exemplary embodiment the base body may include SS400 series/Ti and the conductor may include SS400 series.

Figure 18:
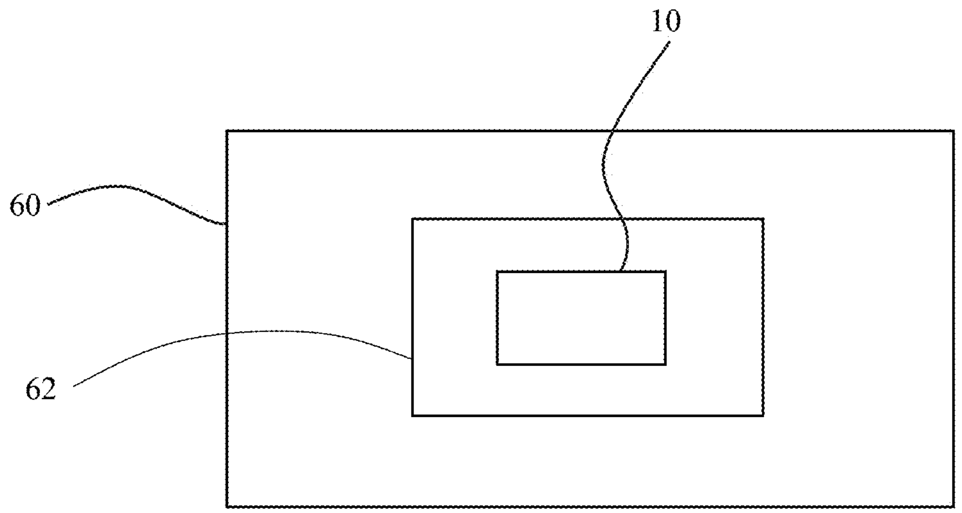
FIG. 18 shows an electronic device schematically.

Referring to FIG. 18, there is shown schematically an electronic device 60, which includes a port 62. Port 62 includes electrical feedthrough 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical feedthrough, comprising:

a base body, which is made from a metal material and has a first side and an opposed second side and at least one through-hole extending through the base body from the first side to the second side;

an insulating material received in the at least one through-hole, the insulating material having a first surface on the first side of the base body and an opposed second surface on the second side of the base body; and an electrical conductor extending through the insulating material, the electrical conductor having a first diameter at a location of the first surface of the insulating material and a second diameter at a location of the second surface of the insulating material, the first diameter of the electrical conductor being larger than the second diameter of the electrical conductor, the insulating material being configured and arranged to electrically insulate the electrical conductor from the base body, wherein:

(i) the electrical conductor (1) ends flush with the first surface of the insulating material on the first side of the base body or (2) is offset from the first surface of the insulating material by less than 500 μm, such that the first surface of the insulating material is grinded flush with the electrical conductor or forms a meniscus which transitions flush to the electrical conductor; and (ii) the electrical conductor protrudes from the second surface of the insulating material on the second side of the base body, the protrusion being more than 500 μm.

2. The electrical feedthrough according to claim 1, wherein at least one of:

(i) the electrical conductor has a first section comprising a location of the first diameter and extending from the first surface of the insulating material into the insulating material, wherein the first section of the electrical conductor has a constant diameter;

(ii) the electrical conductor has a second section comprising a location of the second diameter and extending from the second surface of the insulating material into the insulating material, wherein the second section of the electrical conductor has a constant diameter; and (iii) the electrical conductor has a tapered section between the location of the first diameter and the location of the second diameter, wherein the tapered section has a tapered diameter and wherein the tapered section is located between the first section and the second section within the insulating material.

3. The electrical feedthrough according to claim 2, wherein at least one of:

the electrical conductor has a length L between the location of the first diameter and the location of the second diameter, the length L being in a range of 0.2 mm to 10 mm, in a range of 0.3 mm to 5 mm, or in a range of 1 mm to 3 mm;

at least one of (i) the first section of the electrical conductor has a length L1 and (ii) the tapered section of the electrical conductor has a length L3, wherein the length L1, the length L3, or the length L1+the length L3 is at least 0.1 mm, at least 0.3 mm, or at least 0.6 mm;

at least one of (i) the first section of the electrical conductor has a length L1 and (ii) the tapered section of the electrical conductor has a length L3, wherein a ratio of the length L1/the length L, a ratio of the length L3/the length L, or a ratio of (the length L1+the length L3)/the length L is smaller than 0.7, is smaller than 0.5, or is smaller than 0.35;

wherein the second section of the electrical conductor has a length L2, wherein a ratio of the length L2/the length L is larger than 0.3, is larger than 0.5, or is larger than 0.65; and the tapered section of the electrical conductor has a length L3, wherein a ratio of the length L3/the length L1 is between 1.25 and 3.0, between 1.5 and 2.5, or between 1.75 and 2.25.

4. The electrical feedthrough according to claim 2, wherein at least one of:

a ratio of the first diameter to the second diameter of the electrical conductor is between 1.1 and 10, between 1.25 and 3.5, between 1.5 and 3.0, or between 1.75 and 2.75;

the first diameter is at least 0.8 mm, at least 1 mm, or at least 1.5 mm;

the second diameter is at most 1 mm, at most 0.8 mm, or at most 0.5 mm;

the tapered section of the electrical conductor has a diameter tapering from the first diameter to the second diameter; and the tapered section of the electrical conductor has a linearly tapering diameter.

5. The electrical feedthrough according to claim 2, wherein the electrical conductor comprises a groove for a stronger mechanical interlock with the insulating material, wherein the groove is located in the second section of the electrical conductor.

6. The electrical feedthrough of claim 1, wherein the at least one through-hole is at least two through-holes, the base body including the at least two through-holes extending through the base body, wherein in each of the at least two through-holes a respective one of the insulating material is received, each respective one of the insulating material having a respective one of the first surface on the first side of the base body and a respective one of the opposed second surface on the second side of the base body, and wherein in each of the at least two through-holes a respective one of the electrical conductor extends through each respective one of the insulating material.

7. The electrical feedthrough according to claim 6, wherein at least one of:

(i) at least two of the electrical conductor extend through the insulating material or each of the insulating material;

(ii) a distance between two of the electrical conductor is less than 50 mm, less than 10 mm, or less than 5 mm;

(iii) a distance between two of the electrical conductor is more than 100 μm, more than 150 μm, or more than 200 μm;

(iv) a distance between a respective one of the electrical conductor and the base body is less than 5 mm, less than 2 mm, or less than 1 mm;

(v) a distance between a respective one of the electrical conductor and the base body is more than 100 μm, more than 150 μm, or more than 200 μm; and (vi) a ratio of a surface area of a respective one of the insulating material received in a respective one of the through-hole and a surface area of a respective one of the electrical conductor or respective ones of the electrical conductor in the respective one of the through-hole on at least one of the first side and the second side of the base body is less than 15, less than 10, less than 5, or less than 4.

8. The electrical feedthrough according to claim 6, wherein at least one of:

(i) a respective one of the electrical conductor or each one of the electrical conductor has the first diameter at the location of the first surface of a respective one of the insulating material and the second diameter at the location of the second surface of a respective one of the insulating material;

(ii) a respective one of the through-hole has a diameter, which is constant throughout the base body or is tapered, within a range of 2 degrees to 10 degrees, having a maximum diameter;

(iii a ratio of the diameter of the respective one of the through-hole/the first diameter of the electrical conductor is at most 1.5, is at most 1.3, is at most 1.2, or is at most 1.11; and (iv) a ratio of the diameter of the respective one of the through-hole/the second diameter of the electrical conductor is at most 10, is at most 5, or is at most 2.5.

9. The electrical feedthrough according to claim 6, wherein each of the at least two through-holes has a respective diameter, which is constant throughout the base body, and wherein each of the at least two through-holes defines a half-distance diameter, the half-distance diameter being a distance within the base body between adjacent ones of the through-holes plus the diameter of the respective through-hole, and wherein a ratio of the half-distance diameter/the distance within the base body between adjacent ones of the through-holes of at least the through-holes ene of is smaller than 2.0, is smaller than 1.8, is smaller than 1.7, is smaller than 1.6, is smaller than 1.5, is smaller than 1.4, is smaller than 1.3, is smaller than 1.2, or is smaller than 1.1.

10. The electrical feedthrough according to claim 1, wherein at least one of:

(i) the insulating material is under a contact pressure at the location of the second surface on the second side of the base body, wherein (i) the contact pressure at the location of the second surface on the second side of the base body is a positive contact pressure and (ii) the contact pressure at the location of the second surface on the second side is a negative contact pressure with an absolute value being less than 30 MPa, less than 20 MPa, less than 10 MPa, or less than 5 MPa; and (ii) the insulating material is under a contact pressure at the location of the first surface on the first side of the base body, wherein the contact pressure at the location of the first surface on the first side is a negative contact pressure with an absolute value being more than 1 MPa, more than 5 MPa, or more than 10 MPa.

11. The electrical feedthrough according to claim 1, wherein the insulating material is under a highest positive contact pressure with an absolute value which is lower than 155 MPa, is lower than 70 MPa, is lower than 50 MPa, is lower than 40 MPa, or is lower than 20 MPa.

12. The electrical feedthrough according to claim 1, wherein at least one of:

(i) the base body has a thermal expansion coefficient between $5\times10^{-6}K^{-1}$ and $25\times10^{-6}K^{-1}$ and or between $5\times10^{-6}K^{-1}$ and $20\times10^{-6}K^{-1}$;

(ii) the insulating material has a thermal expansion coefficient between $3\times10^{-6}K^{-1}$ and or $15\times10^{-6}K^{-1}$ and between $5\times10^{-6}K^{-1}$ and $12\times10^{-6}K^{-1}$;

(iii) the electrical conductor has a thermal expansion coefficient between $3\times10^{-6}K^{-1}$ and $25\times10^{-6}K^{-1}$ and or between $5\times10^{-6}K^{-1}$ and $20\times10^{-6}K^{-1}$;

(iv) the base body comprises at least one of the following materials: metal; austenitic stainless steel; a metal of AISI 300 series; ferritic stainless steel; a metal of AISI 400 series; titanium; inconel; duplex stainless steel; niobium; and an alloy of austenitic stainless steel, a metal of AISI 300 series, ferritic stainless steel, a metal of AISI 400 series, titanium, inconel, duplex stainless steel, or niobium;

(v) the insulating material comprises at least one of the following materials: glass; glass ceramic; and ceramic; and (vi) the electrical conductor comprises at least one of the following materials: metal; metal alloy; stainless steel 300 series; stainless steel 400 series; titanium; NiFe; NiFeCo alloy; niobium; copper; tungsten; molybdenum; platinum; and an alloy of metal, stainless steel 300 series, stainless steel 400 series, titanium, NiFe, NiFeCo alloy, niobium, copper, tungsten, molybdenum, or platinum.

13. The electrical feedthrough according to claim 1, wherein the base body and the electrical conductor are free of a nickel leaching.

14. A port for wearable electronic devices, the port being a charging port or a medical port, the port comprising:

an electrical feedthrough, comprising:

a base body, which is made from a metal material and has a first side and an opposed second side and at least one through-hole extending through the base body from the first side to the second side;

an insulating material received in the at least one through-hole, the insulating material having a first surface on the first side of the base body and an opposed second surface on the second side of the base body; and an electrical conductor extending through the insulating material, the electrical conductor having a first diameter at a location of the first surface of the insulating material and a second diameter at a location of the second surface of the insulating material, the first diameter of the electrical conductor being larger than the second diameter of the electrical conductor, the insulating material being configured and arranged to electrically insulate the electrical conductor from the base body, wherein:

(i) the electrical conductor (1) ends flush with the first surface of the insulating material on the first side of the base body or (2) is offset from the first surface of the insulating material by less than 500 μm, such that the first surface of the insulating material is grinded flush with the electrical conductor or forms a meniscus which transitions flush to the electrical conductor; and (ii) the electrical conductor protrudes from the second surface of the insulating material on the second side of the base body, the protrusion being more than 500 μm.

15. The port according to claim 14, wherein the port is configured for being for wearables.

* * * * *